(12) United States Patent
Bookbinder et al.

(10) Patent No.: US 7,433,566 B2
(45) Date of Patent: Oct. 7, 2008

(54) LOW BEND LOSS OPTICAL FIBER WITH HIGH MODULUS COATING

(75) Inventors: Dana Craig Bookbinder, Corning, NY (US); Ming-Jun Li, Horseheads, NY (US); Mark Alan McDermott, Horseheads, NY (US); Daniel Aloysius Nolan, Corning, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 11/823,681

(22) Filed: Jun. 28, 2007

(65) Prior Publication Data

US 2008/0013905 A1    Jan. 17, 2008

Related U.S. Application Data

(60) Provisional application No. 60/817,863, filed on Jun. 30, 2006.

(51) Int. Cl.
*G02B 6/02* (2006.01)
*G20B 6/036* (2006.01)

(52) U.S. Cl. .................. 385/128; 385/123; 385/126

(58) Field of Classification Search .................. None
See application file for complete search history.

(56) References Cited

U.S. PATENT DOCUMENTS

| | | | |
|---|---|---|---|
| 5,191,206 A | 3/1993 | Boiarski et al. | 250/227.14 |
| 5,802,236 A | 9/1998 | DiGiovanni et al. | 385/127 |
| 6,243,522 B1 | 6/2001 | Allan et al. | 385/123 |
| 6,377,724 B1 | 4/2002 | Bookbinder et al. | 385/16 |
| 6,418,258 B1 | 7/2002 | Wang | 385/125 |
| 6,596,394 B2 | 7/2003 | Toler et al. | 428/392 |
| 6,614,974 B2 | 9/2003 | Elrefaie et al. | 385/125 |
| 6,671,442 B2 | 12/2003 | Wang et al. | 385/125 |
| 6,687,445 B2 | 2/2004 | Carter et al. | 385/127 |
| 6,733,824 B1 | 5/2004 | Bookbinder et al. | 427/154 |
| 6,766,088 B2 | 7/2004 | Hasegawa et al. | 385/123 |
| 6,767,579 B1 | 7/2004 | Bookbinder et al. | 427/154 |
| 6,773,825 B2 | 8/2004 | Pickrell et al. | 428/566 |
| 6,795,635 B1 | 9/2004 | Fajardo et al. | 385/140 |
| 6,904,215 B2 | 6/2005 | Christoff et al. | 385/124 |
| 7,039,284 B2 | 5/2006 | Nakahara | 385/125 |

(Continued)

FOREIGN PATENT DOCUMENTS

EP    1617243 A1    3/2004

(Continued)

OTHER PUBLICATIONS

Bing, Y. et al, "Low-loss Holey Fiber", Hitachi Cable Review No. 24, Aug. 2005, pp. 1-5.

(Continued)

*Primary Examiner*—Tina M Wong
(74) *Attorney, Agent, or Firm*—Robert L. Carlson; Matthew J. Mason

(57) ABSTRACT

Optical fiber having a coating surrounding and in direct contact with the silica based cladding region of the fiber, the coating having a Young's modulus of elasticity greater than 30 MPa. The optical fiber has low bend losses, especially low microbend induced losses. The optical fiber has a core surrounded by a cladding, and the cladding has a ring portion that includes holes or doped silica or both.

22 Claims, 12 Drawing Sheets

U.S. PATENT DOCUMENTS

| | | | |
|---|---|---|---|
| 7,054,513 B2 | 5/2006 | Herz et al. | 385/12 |
| 7,072,552 B2 | 7/2006 | Manyam et al. | 385/125 |
| 7,142,758 B1 | 11/2006 | Herz et al. | 385/125 |
| 7,174,078 B2 | 2/2007 | Libori et al. | 385/125 |
| 2002/0106173 A1* | 8/2002 | Stupak et al. | 385/128 |
| 2003/0152350 A1* | 8/2003 | Konda et al. | 385/128 |
| 2004/0069019 A1 | 4/2004 | Carter et al. | 65/414 |
| 2005/0084224 A1* | 4/2005 | Greer et al. | 385/128 |
| 2005/0094954 A1 | 5/2005 | Pickrell et al. | 385/123 |
| 2006/0034574 A1 | 2/2006 | Guan et al. | 385/125 |
| 2007/0104437 A1 | 5/2007 | Bookbinder et al. | 385/125 |

FOREIGN PATENT DOCUMENTS

| | | |
|---|---|---|
| EP | 1564569 A1 | 9/2004 |
| WO | WO02/102730 | 6/2001 |
| WO | WO02/075393 | 9/2002 |
| WO | WO2005/010589 | 2/2005 |
| WO | WO2008/005233 | 1/2008 |

OTHER PUBLICATIONS

Matsuo, S. et al, "Bend-Insensitive and Low-Splice-Loss Optical fiber for Indoor Wiring in FTTH", Optical Fiber Communication Conference, 2004, Feb. 23-27, 2004, vol. 2, 3 pgs. with descriptive sheet attached.

Baggett, Joanne C. et al, "Improving Bending Losses in Holey Fibers", Optical Fiber Communication Conference, 2005. Technical Digest. OFC/NFOEC, Mar. 6-11, 2005, vol. 3, 3 pp.

Ellis, Frederick P. K., "Fabrication of Random Hole Optical Fiber Preforms by Silica Sol-Gel Processing", Thesis to be submitted to Virginia Polytechnic Institute and State University, Feb. 19, 2004, 34 pp.

Fini, J. M., "Design of solid and microstructure fibers for suppression of higher-order modes", Optics Express, May 2, 2005, vol. 13, No. 9, pp. 3477-3490.

Guan, Ning et al, "Characteristics of field confined holey fiber analyzed by boundary element method", OFC 2002, Mar. 17-22, 2002, pp. 525-527.

Himeno, Kuniharu et al, "Low-Bending-Loss Single-Mode Fibers for Fiber-to-the-Home", Journal of Lightwave Technology, Nov. 2005, vol. 23, No. 11, pp. 3494-3499.

Holton, Carvel et al, "Colloidal Quantum Dots Entrained in Microstructured Optical Fibers", Proceedings of SPIE, 2004, vol. 5335, pp. 258-265.

Kominsky, Daniel, "Development of Random Hole Optical Fiber and Crucible Technique Optical Fibers", Dissertation submitted to Virginia Polytechnic Institute and State University, Sep. 6, 2005, 142 pp.

Kominsky, D. et al, "Generation of random-hole optical fiber", Optics Letters, Aug. 15, 2003, vol. 23, No. 16, pp. 1409-1411.

Monro, Tanya M. et al, "Holey fibers with random cladding distributions", Optics Letters, Feb. 15, 2000, vol. 25, No. 4, pp. 206-208.

Monro, Tanya M. et al, "Holey fibers with randomly arranged air holes", Conference on Lasers and Electro-Optics, 2000. (CLEO 2000), pp. 607-608.

Monro, Tanya M. et al, "New possibilities with holey fibers", Optical Fiber Communication Conference, 2000, vol. 3, pp. 106-108.

Nielsen, M.D. et al, "Singlemode photonic crystal fibre with effective area of 600 lm2 and low bending loss", Electronics Letters, Dec. 11, 2003, vol. 39, No. 25, 1802-1803.

Nielsen, M.D., et al, "Bandwidth comparison of photonic crystal fibers and conventional single-mode fibers", Feb. 9, 2004, Optics Express, vol. 12, No. 3, pp. 430-435.

Pickrell, Gary et al, "Fiber Optic Chemical Sensing", Proceedings of SPIE, vol. 5998, Nov. 5, 2005, 15 pp.

Pickrell, Gary et al, "Microstructural Analysis of Random Hole Optical Fibers", IEEE Photonics Technology Letters, Feb. 2004, vol. 16, No. 2, pp. 491-493.

Pickrell, Gary R. et al, "New fabrication technique for random-hole optical fibers", Proceedings of SPIE—The International Society for Optical Engineering, v 5589, Fiber Optic Sensor Technology and Applications III, Oct. 26-28, 2004, pp. 257-265.

Pickrell, Gary R. et al, "Novel Techniques for the Fabrication of Holey Optical Fibers", The International Society for Optical Engineering, v 4578, Fiber Optic Sensor Technology and Applications 2001, Oct. 30-Nov. 1, 2001, pp. 271-282.

Pickrell, G. et al, "Random-hole optical fiber evanescent-wave gas sensing", Optics Letters, Jul. 1, 2004, vol. 29, No. 13, pp. 1476-1478.

Pickrell, Gary R. et al, "Random Hole Optical Fibers", Proceedings of SPIE, Industrial and Highway Sensors Technology, 2003, vol. 5272, pp. 207-215.

Richardson, D. J. et al, "Advances in Microstructured Fiber Technology", Proceedings of 2005 IEEE/LEOS Workshop on Fibres and Optical Passive Components, Jun. 22-24, 2005, pp. 1-9.

Sakabe, Itaru et al, "Performance of Bend-insensitive Single Mode Fiber and its Application to Optical Access Networks", SEI Technical Review, Jan. 2005, No. 59, pp. 32-37.

Shinohara, Hiromichi, "Broadband Access in Japan: Rapidly Growing FTTH Market", IEEE Communications Magazine, Sep. 2005, pp. 72-78.

Tsuchida, Yukihiro et al, "Design and characterization of single-mode holey fibers with low bending losses", Optics Express, Jun. 13, 2005, vol. 13, No. 12, pp. 4770-4779.

Wu, Tzong-Lin et al, "A Novel Ultraflattened Dispersion Photonic Crystal Fiber", IEEE Photonics Technology Letters, Jan. 2005, vol. 17, No. 1, pp. 67-69.

* cited by examiner 25 kV 900X

LOW BEND LOSS OPTICAL FIBER WITH HIGH MODULUS COATING

CROSS-REFERENCE TO RELATED APPLICATIONS

This application claims the benefit of and priority to U.S. patent application Ser. No. 60/817,863 filed on Jun. 30, 2006, the content of which is relied upon and incorporated herein by reference in its entirety.

BACKGROUND OF THE INVENTION

1. Field of the Invention

The present invention relates generally to optical fibers, and more specifically to optical fibers with low bend loss.

2. Technical Background

Optical fibers formed of glass materials have been in commercial use for more than two decades. Such optical fibers are typically comprised of silica doped with one or more dopants, such as germanium, fluorine, and/or other dopants, to achieve a refractive index profile that results in guiding light signals along the length of the fiber. Other optical fiber is assisted by the presence of holes in the silica, or hole assisted optical fiber, which includes holes or voids running longitudinally along the fiber axis, such as in microstructured optical fiber. The holes generally contain air or an inert gas, but may also contain other materials. The majority of hole assisted optical fiber have a plurality of holes located around the core, wherein the holes continue for a relatively long (e.g. for many tens of meters or more) distance along the length of the fiber, and typically the holes extend along the entire length of the optical fiber. These cladding holes are also most typically arranged in a regular, periodic formation around the core of the optical fiber. In other words, if cross sections of the optical fiber are taken along the length of the optical fiber, the same individual holes can be found in essentially the same periodic hole structure relative to one another. Examples of such microstructured fibers include those described in U.S. Pat. No. 6,243,522.

Microstructured optical fibers may be designed to have a wide variety of properties, and may be used in a wide variety of applications. For example, microstructured optical fibers having a solid glass core and a plurality of holes disposed in the cladding region around the core have been constructed. The position and sizes of the holes may be designed to yield microstructured optical fibers with dispersions ranging anywhere from large negative values to large positive values. Such fibers may be useful, for example, in dispersion compensation. Solid-core microstructured optical fibers may also be designed to be single molded over a wide range of wavelengths. Most solid-core microstructured optical fibers guide light by a total internal reflection mechanism; the low index of the holes acts to lower the effective index of the cladding region in which they are disposed.

Micro-structured optical fibers are typically manufactured by the so-called "stack-and-draw" method, wherein an array of silica rods and/or tubes are stacked in a close-packed arrangement to form a preform, that can be drawn into fiber using a conventional tower setup.

Most optical fiber manufactured today includes a first coating (so-called "primary coating") surrounding and in contact with the cladding glass portion of the fiber, and a second coating (so-called "secondary coating"). The primary coating in older fibers typically had a Young's modulus of about 3 to 5 MPa, while the primary coating modulus of more recent fibers is typically 0.6 to 2 MPa, and the secondary coating in older fibers typically had a Young's modulus of about 400 to 600 MPa, while the secondary coating modulus of more recent fibers is typically about 1000 to 2000 MPa. Primary coatings in known fibers have been utilized specifically to reduce signals losses because of stresses in the fiber induced by microbending of the fiber.

SUMMARY OF THE INVENTION

Optical fiber is disclosed herein comprising a core region and a cladding region surrounding the core region. The core region has a higher refractive index than the cladding region, such that the core region and the cladding region together retain generally within the core region at least one mode of the light transmitted through the fiber. A coating surrounds and is in direct contact with the cladding region. The core region and the cladding region are comprised of silica. The core region is disposed about a longitudinal centerline. The coating has a Young's modulus of elasticity greater than 30 MPa, preferably between 30 MPa and 4000 MPa, more preferably between 30 MPa and 2000 MPa. The coated optical fiber exhibits low bend losses, i.e., lowered increases in attenuation due to bending, particularly losses due to microbending.

In preferred embodiments, the cladding region comprises an annular portion, or "ring" that surrounds the core region. The ring provides internal reflection sufficient to guide light along the core region of the fiber. In some preferred embodiments, the ring is surrounded and in contact with an outer annular region, which in some embodiments the outer annular region is essentially pure silica and in other embodiments is doped silica. In some embodiments, the ring is immediately adjacent the core region, and in other embodiments, an inner annular portion is disposed between the core region and the ring, which in some embodiments the inner annular portion is essentially pure silica and in other embodiments is doped silica, such that the ring is an: intermediate annular portion.

In a first aspect, the ring is a hole-containing region. In some embodiments, the ring is surrounded by and in contact with a hole-free outer annular region, which in some embodiments the outer annular region is essentially pure silica and in other embodiments doped silica. The ring comprises non-periodically disposed holes, or periodically disposed holes, or both. In some preferred embodiments, the cladding region comprises a hole-free inner annular portion surrounding and in contact with the core region, an intermediate annular region (ring) surrounding and in contact with the inner annular portion, and a hole-free outer annular portion surrounding and in contact with the ring, and in some embodiments the inner annular portion and outer annular portion are essentially pure silica. Thus, the hole-containing region has holes disposed in silica, the silica being essentially pure or doped with one or more dopants, such that the hole-containing region has holes with a refractive index much lower than silica, and moreover the region is a heterogeneous region comprised of undoped or doped silica and holes (empty or gas filled) that has an effective refractive index that includes the composite refractive index effect of silica, doped or undoped, in which the holes are disposed, as well as any gas(es) disposed within the holes, the combined refractive index effect being lower than the maximum refractive index in the core region, and being lower than the maximum refractive index in the inner annular region in those embodiments having an inner annular region, and being lower than the maximum refractive index in the outer annular region in those embodiments having an outer annular region. In preferred embodiments, the maximum refractive index in the core region is the peak refractive index for the entire fiber cross-section.

In a second aspect, the "ring" is a hole-free annular portion made of silica providing a refractive index lower than a refractive index in the core region. In some embodiments, the ring comprises doped silica, such as fluorine doped silica, and in other embodiments, the ring consists of essentially pure silica. In some embodiments, the ring is surrounded by an outer annular portion and the ring comprises a minimum refractive index lower than a maximum refractive index in the core region and lower than a maximum refractive index in the outer annular portion, and preferably also lower than a maximum refractive index in the inner annular portion. In some embodiments, the cladding region comprises a hole-free inner annular portion surrounding and in contact with the core region, a hole-free intermediate annular region (ring) comprised of doped silica surrounding and in contact with the inner annular portion, and a hole-free outer annular portion surrounding and in contact with the ring, and in some preferred embodiments the inner annular portion and outer annular portion consisting of essentially pure silica. Thus, the ring has a minimum refractive index which is lower than the maximum refractive index in the core region, and which is lower than the maximum refractive index in the inner annular region in those embodiments having an inner annular region, and which is lower than the maximum refractive index in the outer annular region in those embodiments having an outer annular region. In preferred embodiments, the maximum refractive index in the core region is the peak refractive index for the entire fiber cross-section.

Preferably, the optical fiber disclosed herein has a length greater than 1 meter, and in some embodiments greater than 10 meters, and in other embodiments greater than 100 meters, and in still other embodiments greater than 1 km, wherein the coating surrounds and is in direct contact with the cladding region along the entire length, the coating having a Young's modulus of elasticity greater than 30 MPa, preferably between 30 MPa and 4000 MPa, more preferably between 30 MPa and 2000 MPa.

In some embodiments, the optical fiber exhibits a microbend induced loss of less than 5 dB, preferably less than 4 dB, more preferably less than 3 dB, at a wavelength of 1550 nm as measured by a lateral load wire mesh test.

In preferred embodiments, the coating is a single layer coating in direct contact with the glass fiber. Preferably, the single layer has a radial thickness from 2 nm to 2 mm, more preferably from 200 nm to 2 mm.

In some embodiments, the optical fiber transmits, or is capable of transmitting, a single-mode of light at wavelengths of 1500 nm and more. In other embodiments, the optical fiber transmits, or is capable of transmitting, a single-mode of light at wavelengths of 1260 nm and more. In still other embodiments, the optical fiber transmits, or is capable of transmitting, multiple modes of light at wavelengths of 1500 nm and more, i.e. multimode optical fiber. In preferred embodiments, the multimode fiber has a core with a graded-index core, or parabolically shaped, refractive index profile, with an alpha of about 2, and is preferably used at 850 and 1310 nm.

In some embodiments, the coating is comprised of one or more UV cured polymers, such as acrylates, silicones, or epoxies. In other embodiments, the coating is comprised of one or more thermoplastic polymers, such as polyolefins, PVC, polyamides, or PBT.

In some embodiments, the optical fiber has a microbend induced loss of less than 5 dB at a wavelength of 1625 nm as measured by a lateral load wire mesh test.

In some embodiments, the optical fiber has a microbend induced loss of less than 5 dB for all wavelengths between 1250 and 1700 nm as measured by a lateral load wire mesh test.

Preferably, the optical fiber exhibits low macrobend losses as well as low microbend losses.

In some embodiments of the first aspect, the hole-containing region comprises holes that are spatially non-periodically disposed in the hole-containing region. In other embodiments, the hole-containing region comprises holes that are spatially periodically disposed in the hole-containing region.

In one set of embodiments, the cladding region of the optical fiber disclosed herein comprises an inner annular region surrounding and in contact with the core region, an intermediate annular region surrounding and in contact with the inner annular region, and an outer annular region surrounding and in contact with the intermediate annular region. The intermediate annular region is a hole-containing region, and the inner annular region and the outer annular region are preferably hole-free. In some embodiments of the second aspect, the intermediate annular region is doped with an index-decreasing dopant such as fluorine or boron, and the outer annular region preferably consists of pure silica. In other embodiments in the first or second aspects, the outer annular region is doped with an index increasing dopant, such as germanium or chlorine, to provide a refractive index that is higher than found in the intermediate annular region, and in some of these embodiments, the intermediate annular region consists of pure silica. In some embodiments, the inner annular region consists of pure silica. In some embodiments, the outer annular region, or at least the portion of the outer annular region that contacts the intermediate annular region, consists of pure silica. In one subset of preferred embodiments, both the inner annular region and at least a portion of the outer annular region consist of pure silica.

In one set of embodiments, the core region comprises one or more index-increasing dopants, such as germanium. In another set of embodiments, the core region comprises one or more one or more portions consisting of pure silica, and in some embodiments the core region consists of pure silica.

In some embodiments, the optical fiber is single-molded at a wavelength of 1550 nm. In other embodiments, the optical fiber is single-molded at a wavelength of 1310 nm.

In one set of embodiments, the optical fiber is for transmitting optical signals comprised of light, the optical fiber comprising: a core region disposed about a longitudinal centerline and having a refractive index profile with a first maximum relative refractive index $\Delta 1$; a cladding region surrounding the core region, wherein the cladding region comprises an inner annular portion surrounding and in contact with the core region, a ring portion surrounding and in contact with the inner annular portion, and an outer annular portion surrounding and in contact with the ring portion, the inner annular portion comprising a second maximum relative refractive index $\Delta 2$, the ring portion comprising a minimum refractive index $\Delta MIN$, and the outer annular portion comprising a third maximum relative refractive index $\Delta 3$, wherein $\Delta 1 > \Delta 2 > \Delta MIN$, and $\Delta 3 > \Delta MIN$, and $\Delta 1 > \Delta 3$, wherein the outer annular portion comprises an outermost glass periphery; and a coating surrounding and in direct contact with the outermost glass periphery of the cladding region, the coating having a Young's modulus of elasticity greater than 30 MPa; wherein the optical fiber exhibits a microbend induced loss of less than 5 dB at a wavelength of 1550 nm as measured by a lateral load wire mesh test. In some embodiments, the coating is comprised of a UV cured polymer, and in some of these embodiments, the polymer is selected from the group consisting of acrylates, silicones, and epoxies. In other embodiments, the coating is comprised of a thermoplastic polymer, and in some of these embodiments, the thermoplastic polymer is selected from the group consisting of polyolefins and polyvinylchlorides. In some embodiments, the optical fiber has a microbend induced loss of less than 5 dB at a wavelength of 1625 nm as measured by a lateral load wire mesh test. In some embodiments, the optical fiber has a microbend induced loss of less than 5 dB for all wavelengths between 1250 and 1700 nm as measured by a lateral load wire mesh test. In some embodiments, the optical fiber has a 10 mm diameter bend induced loss of less than 5 dB/turn for all wavelengths between 1250 and 1700 nm. In some embodiments, the optical fiber has a 6.33 mm diameter bend induced loss of less than 5 dB/turn for all wavelengths between 1250 and 1700 nm. In some embodiments, the ring portion is provided with holes; in some of these embodiments, at least some of the holes are spatially non-periodically and/or periodically disposed in the ring portion. In some embodiments, the ring portion is doped with an index-decreasing dopant. In some embodiments, the inner annular portion is hole-free. In some embodiments, the outer annular portion is hole-free. In some embodiments, $\Delta 2$ is substantially equal to $\Delta 3$. In some embodiments, the inner annular portion is hole-free, the ring portion comprises holes, and the outer annular portion is hole-free.

In another set of embodiments, the optical fiber is for transmitting optical signals comprised of light, the optical fiber comprising: a core region disposed about a longitudinal centerline and having a refractive index profile with a first maximum relative refractive index $\Delta 1$; a cladding region surrounding the core region, the cladding region comprising a hole-free inner annular portion surrounding and in contact with the core region, a hole-containing ring portion surrounding and in contact with the inner annular portion, and a hole-free outer annular portion surrounding and in contact with the ring portion, the inner annular portion comprising a second maximum relative refractive index $\Delta 2$, and the outer annular portion comprising a third maximum relative refractive index $\Delta 3$, wherein $\Delta 1 > \Delta 2$, and $\Delta 1 > \Delta 3$, and wherein the ring region provides internal reflection sufficient to guide the light along an axial length of the core region; and a coating surrounding and in direct contact with the outer annular portion of the cladding region, the coating having a Young's modulus of elasticity greater than 30 MPa; wherein the optical fiber exhibits a microbend induced loss of less than 5 dB at a wavelength of 1550 nm as measured by a lateral load wire mesh test.

In another set of embodiments, the optical fiber is for transmitting optical signals comprised of light, the optical fiber comprising: a core region disposed about a longitudinal centerline and having a refractive index profile with a first maximum relative refractive index $\Delta 1$; a cladding region surrounding the core region, the cladding region comprising an outermost glass periphery and a hole-containing ring portion surrounding the core region; and a coating surrounding and in direct contact with the outermost glass periphery of the cladding region, the coating having a Young's modulus of elasticity greater than 30 MPa; wherein the optical fiber exhibits a microbend induced loss of less than 5 dB at a wavelength of 1550 nm as measured by a lateral load wire mesh test. In some embodiments, the cladding region further comprises a hole-free inner annular portion surrounding and in contact with the core region, and the ring portion surrounds and is in contact with the inner annular portion, the inner annular portion comprising a second maximum relative refractive index $\Delta 2$, wherein $\Delta 1 > \Delta 2$; in some of these embodiments, the cladding region further comprises a hole-free outer annular portion surrounding and in contact with the ring portion, the outer annular portion comprising a third maximum relative refractive index $\Delta 3$, wherein $\Delta 1 > \Delta 2$ and $\Delta 1 > \Delta 3$; in other embodiments, $\Delta 2$ is substantially equal to $\Delta 3$.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the description serve to explain the principles and operations of the invention.

DETAILED DESCRIPTION OF THE PREFERRED EMBODIMENTS

Figure 1:
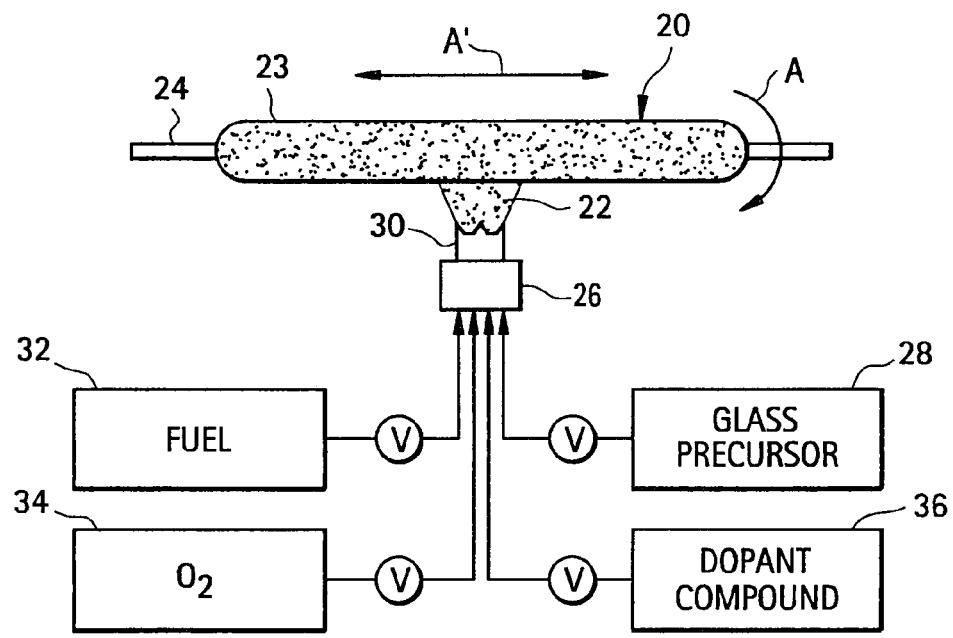
FIG. 1 illustrates an OVD method for forming a soot preform.

The "relative refractive index percent" is defined as $\Delta\% = 100 \times (n_i^2 - n_c^2)/2n_i^2$, where $n_i$ is the maximum refractive index in region i, unless otherwise specified, and $n_c$ is the refractive index of pure (undoped) silica.

The term "α-profile" or "alpha profile" refers to a relative refractive index profile, expressed in terms of Δ(r) which is in units of "%", where r is radius, which follows the equation, $$\Delta(r)=\Delta(r_o)(1-[|r-r_o|/(r_f-r_o)]^\alpha),$$

where $r_o$ is the point at which Δ(r) is maximum, $r_1$ is the point at which Δ(r)% is zero, and r is in the range $r_i \leq r \leq r_f$, where Δ is defined above, $r_i$ is the initial point of the α-profile, $r_f$ is the final point of the α-profile, and α is an exponent which is a real number.

Optical fibers disclosed herein can comprise a cladding region with periodically disposed holes, or non-periodically disposed holes, or both.

By "non-periodically disposed" or "non-periodic distribution", we mean that when one takes a cross section (such as a cross section perpendicular to the longitudinal axis) of the optical fiber, the non-periodically disposed holes are randomly or non-periodically distributed across a portion of the fiber. Similar cross sections taken at different points along the length of the fiber will reveal different cross-sectional hole patterns, i.e., various cross sections will have different hole patterns, wherein the distributions of holes and sizes of holes do not match. That is, the voids or holes are non-periodic, i.e., they are not periodically disposed within the fiber structure. These holes are stretched (elongated) along the length (i.e. parallel to the longitudinal axis) of the optical fiber, but do not extend the entire length of the entire fiber for typical lengths of transmission fiber. While not wishing to be bound by theory, it is believed that the holes extend less than a few meters, and in many cases less than 1 meter along the length of the fiber, such that for longer lengths of fiber, at least some holes extend generally parallel to the longitudinal axis of the fiber for some length, but the holes have closed ends.

Optical fiber having a cladding region with non-periodically disposed holes can be made by, for example, one method described below which utilizes preform consolidation conditions which are effective to result in a significant amount of gases being trapped in the consolidated glass blank, thereby causing the formation of voids in the consolidated glass optical fiber preform. Rather than taking steps to remove these voids, the resultant preform is used to form an optical fiber with voids, or holes, therein.

As used herein, the diameter of a hole is the longest line segment whose endpoints are disposed on the silica internal surface defining the hole when the optical fiber is viewed in perpendicular cross-section transverse to the longitudinal axis of the fiber.

During the manufacture of transmission optical fibers by conventional soot deposition processes such as the outside vapor deposition (OVD) process or the vapor axial deposition (VAD) process, silica and doped silica particles are pyrogenically generated in a flame and deposited as soot. In the case of OVD, silica soot preforms are formed layer-by-layer by deposition of the particles on the outside of a cylindrical target rod by traversing the soot-laden flame along the axis of the cylindrical target. Such porous soot preforms are subsequently treated with a drying agent (e.g., chlorine) to remove water and metal impurities and are then consolidated or sintered into glass blanks at temperatures ranging from 1100-1500° C. Surface energy driven viscous flow sintering is the dominant mechanism of sintering, which results in densification and closing of the pores of the soot, thereby forming a consolidated glass preform. During the final stages of sintering, the gases used in consolidation may become trapped as the open pores are closed. If the solubility and permeability of the trapped gases in the glass are high at the sintering temperature, then the gases are able to migrate through and out of the glass during the consolidation process. Alternatively, gases which are still trapped after the consolidation phase of the fiber manufacturing process may be outgassed by holding the fiber preforms for a period until the gases migrate out through the glass preforms, thereby leaving one or more voids with vacuum therein within the preform. During the draw operation when the optical fiber is drawn from the preform, these voids close, leaving a void-free or essentially void-free optical fiber. In consolidation processes which are employed to make conventional transmission optical fiber, the goal is to achieve an optical fiber that is entirely free of voids in both the core and cladding region of the optical fiber. Helium is often the gas utilized as the atmosphere during the consolidation of conventional optical fiber preforms. Because helium is very permeable in glass, it very easily exits the soot preform and the glass during the consolidation process, so that after consolidating in helium the glass is free of pores or voids.

One type of optical fiber disclosed herein is made from a preform that was subjected to preform consolidation conditions which are effective to result in a significant amount of gases being trapped in the consolidated glass blank, thereby causing the formation of non-periodically distributed voids in the consolidated glass optical fiber preform. Rather than taking steps to remove these voids, the resultant preform is purposefully used to form an optical fiber with voids therein. In particular, by utilizing relatively low permeability gases and/or relatively high sintering rates, holes can be trapped in the consolidated glass during the consolidation process. The sintering rate can be increased by increasing the sintering temperature and/or increasing the downfeed rate of the soot preform through the sintering zone of the consolidation furnace. Under certain sintering conditions, it is possible to obtain glasses in which the area fraction of the trapped gases is a significant fraction of the total area or volume of the preform. The non-periodically distributed holes or voids which are present in the optical fiber as a result of using such processes are located in the cladding of the optical fiber. Such voids can be used to provide internal reflection sufficient to guide light along the core region of the fiber. In some embodiments, by utilizing the consolidation parameters so that the maximum diameter of the holes or voids is less than the wavelength of the light which is to be transmitted along the length of the fiber (e.g. in the case of optical fibers for use in telecommunications applications, less than 1550 nm), the fiber may be effectively used to transmit information at a particular wavelength.

FIG. 1 illustrates a method of manufacturing a soot optical fiber preform 20 which can be used to make the optical fiber disclosed herein. In the embodiment illustrated in FIG. 1, soot preform 2 is formed by depositing silica-containing soot 22 onto an outside of a rotating and translating mandrel or bait rod 24. This process is known as the OVD or outside vapor deposition process. Mandrel 24 is preferably tapered. The soot 22 is formed by providing a glass precursor 28 in gaseous form to the flame 30 of a burner 26 to oxidize it. Fuel 32, such as methane ($CH_4$), and combustion supporting gas 34, such as oxygen, are provided to the burner 26 and ignited to form the flame 30. Mass flow controllers, labeled V, meter the appropriate amounts of suitable dopant compound 36 silica glass precursor 28, fuel 32 and combustion supporting gas 34, all preferably in gaseous form, to the burner 26. The glass former compounds 28, 36 are oxidized in the flame 30 to form the generally cylindrically-shaped soot region 23. In particular, a dopant compound 36 may be included if desired. For example, a germanium compound may be included as an index of refraction increasing dopant (e.g., in the core of the fiber), or a fluorine containing compound or a boron containing compound may be included to lower the index of refraction (e.g., in the cladding and/or void containing region of the fiber).

Figure 3:
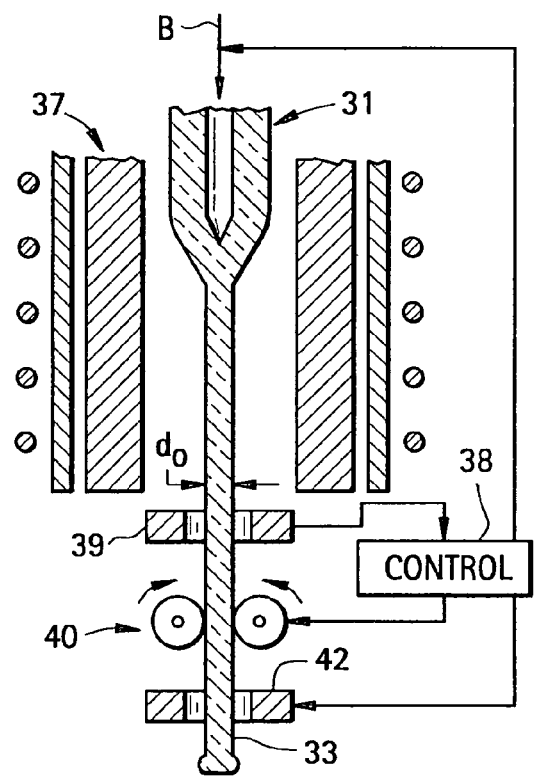
FIG. 3 illustrates a redraw process for forming a core cane.
Figure 2:
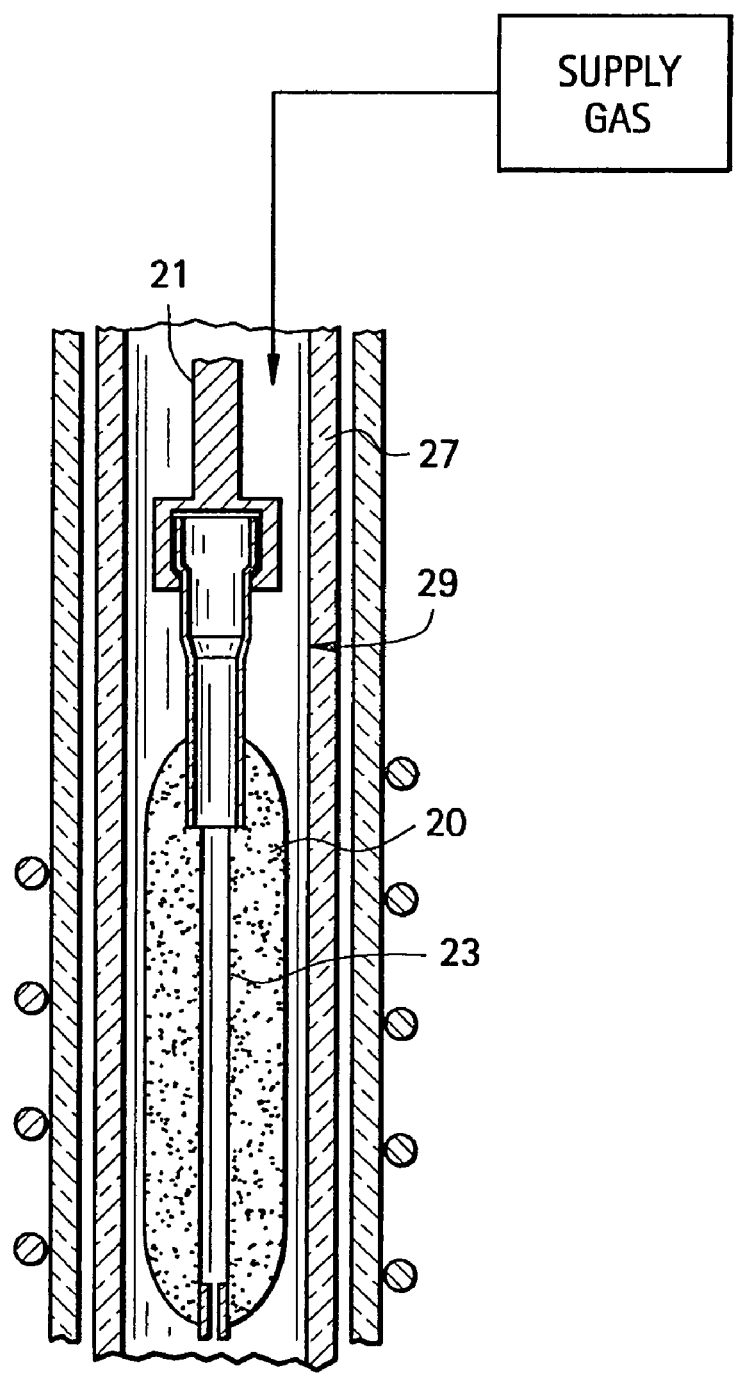
FIG. 2 illustrates a cross-sectional side view of a consolidation process in accordance with the invention.

As illustrated in FIG. 2, the soot preform 20 including the cylindrical soot region 23 may be consolidated in a consolidation furnace 29 to form a consolidated blank 31 (shown in subsequent FIG. 3). Prior to consolidation, the mandrel 24 illustrated in FIG. 1 is removed to form a hollow, cylindrical soot blank preform. During the consolidation process, the soot preform 20 is suspended, for example, inside a pure quartz muffle tube 27 of the furnace 29 by a holding mechanism 21. Preferably, before the consolidation step the preform 20 is exposed to a drying atmosphere. For example, a suitable drying atmosphere may include about 95 percent to 99 percent helium and 1 percent to 5 percent chlorine gas at a temperature of between about 950° C. and 1250° C. and a suitable drying time ranges from about 0.5 and 4.0 hours. The soot preform can also be doped, if desired, for example using a dopant gas having fluorine or boron or other optical fiber dopants, singly or in combination, therein. For example, to dope with fluorine, $SiF_4$ and/or $CF_4$ gas may be employed. Such dopant gases may be employed using conventional doping temperatures, for example between about 950 and 1250° C. for 0.25 to 4 hours.

During the consolidation step, which preferably takes place after a soot drying step, the furnace temperature is raised and the preform 20 is consolidated at a suitable temperature, for example between about 1390° C. and 1535° C. to form a consolidated preform. Alternatively, and more preferably, gradient sintering may be employed whereby the soot preform 20 is driven down through a hot zone of the furnace 29 which is maintained at a temperature of between about 1225° C. to 1550° C., more preferably between about 1390° C. and 1535° C. For example, the preform may be held in an isothermal zone which is maintained at a desired drying temperature (950-1250° C.), after which the soot preform is driven through a zone which is maintained at a desired consolidation temperature (e.g. 1225° C. to 1550° C., more preferably 1390° C. and 1535° C.) at a rate of speed which is sufficient to result in the preform 20 temperature increasing by greater than 1° C./min. Upper zones of the furnace can be maintained at lower temperatures which facilitate a drying and impurity removal step. The lower zone can be maintained at the higher temperatures desired for consolidation. In one preferred embodiment, the soot containing preform is downfed through a consolidation hot zone at a first downfeed rate, followed by downfeeding of the preform through a second hot zone at a second downfeed rate which is less than that of the first downfeed rate. Such a consolidation technique results in the outside portion of the soot preform sintering before the rest of the preform sinters, thereby facilitating trapping of gases which will in turn facilitate formation of and retaining of voids in the resultant consolidated glass. For example, the preform can be exposed to such suitable consolidation temperatures (e.g., greater than about 1390° C.) at a first speed which is sufficient to result in the preform temperature increasing by more than 15° C./min, more preferably greater than 17° C./min, followed by at least a second downfeed rate/consolidation temperature combination which is sufficient to result in the preform heating by at least about 12° C./min, more preferably greater than 14° C./min. Preferably, the first consolidation rate results in the outside of the preform increasing in temperature at a rate which is greater than 2, more preferably greater than 3, and most preferably greater than about 4° C./min higher than the heating rate of the second consolidation rate. If desired, a third consolidation step can be employed which heats at a slower rate (e.g., less than 10° C./min). Alternatively, the soot preform can be sintered at even faster rates in order to create more voids by driving the soot preform through a furnace hot zone where the temperature is greater than 1550° C., more preferably greater than 1700° C., even more preferably greater than 1900° C. Alternatively, the soot preform can be sintered at even faster rates external to the furnace by using an open flame or plasma torch in contact with the soot.

Preferred sintering gases which may be used in the consolidation step are those which comprise at least one gas selected from the group consisting of nitrogen, argon, $CO_2$, oxygen, Chlorine, $CF_4$, CO, $SO_2$, neon, krypton and mixtures thereof. Each of these gases exhibits a relatively low permeability in silica glass at or below the consolidation temperature which is suitable for forming voids in accordance with the methods present invention. Preferably these void producing gases are employed either alone or in combination in an amount between 5 and 100 percent by volume, more preferably between about 20-100 percent by volume and most preferably between about 40-100 percent by volume. The remainder of the sintering gas atmosphere is made up of a suitable diluent or carrier gas such as, for example, helium, hydrogen, deuterium, or mixtures thereof. Generally speaking, the greater the percentage by volume of void producing gases (nitrogen, Ar, $CO_2$, $O_2$, $Cl_2$, $CF_4$, CO, $SO_2$, neon, krypton, or mixtures thereof) that is employed in the sintering gas, the larger and more abundant the voids will be in the resultant consolidated glass. More preferably, the sintering gas for use in forming the voids during the consolidation step comprises at least one gas selected from the group consisting of nitrogen, argon, $CO_2$, oxygen, Ne, and krypton, and mixtures thereof. These gases can be utilized entirely alone or in mixtures of such gases along with a carrier gas such as helium. One particularly preferred void producing gas is nitrogen. Applicants have found when employing nitrogen and/or argon either together or individually as a void producing sintering gas it is preferred that the nitrogen and/or argon be employed in the sintering atmosphere in an amount greater that 10 percent by volume, more preferably greater than 30 percent by volume, even more preferably greater than about 50 percent by volume, and most preferably greater than about 65 percent by volume, with the remainder of the sintering atmosphere being a carrier gas such as helium. These gases have been successfully employed at concentrations greater than 85 percent by volume. In fact, up to 100 percent nitrogen gas, up to 100 percent argon gas, and up to 100 percent oxygen gas have been utilized successfully. Voids can also be created by sintering the soot in a low permeability gas (e.g., nitrogen, argon, $CO_2$, oxygen, Chlorine, $CF_4$, CO, $SO_2$, Ne, Kr) under a partial vacuum (e.g., wherein the preform is immersed in a sintering atmosphere is at a pressure of between about 40 to 750 Torr), and in such cases use of a diluent relatively high permeability gas such as helium is not necessary. Using the void producing consolidation techniques disclosed herein, it is possible to make optical fibers having a cladding comprises a void containing region having a void regional void area percent greater than 0.5 percent, or greater than about 1, or greater than about 5 and even greater than about 10 percent. Regional void area percent, as used herein, means the total area of the voids in a void containing region divided by the total area of the void containing region (when the optical fiber is viewed in cross-section taken perpendicular to the axis of the optical fiber) times 100, the void containing region being defined by the inner and outer boundaries of the void containing region. For example, if the radially innermost edge of the radially innermost void in the fiber has a radial location of 4 microns from the axial centerline of the fiber, and the radially outermost edge of the radially outermost void in the fiber has a radial location of 60 microns from the centerline, then the area of the void containing region is approximately 11309−50=11259 square microns. If the total cross sectional area of voids contained in this void containing region is 1100 square microns, then the void area percent of the void containing region is approximately 9.8 percent.

Using the preferred sintering gases described above, it is desirable to employ a consolidation process which includes a downfeed of the preform at a rate and temperature which is sufficient to result in at least some of the consolidation gases being trapped. In some embodiments, this can occur, for example, by heating of at least a portion of the soot preform greater than about 1° C./min. In other embodiments, this can occur, for example, by heating of at least a portion of the soot preform greater than about 10° C./min, more preferably greater than about 12° C./min, even more preferably greater than about 14° C./min. The sintering temperatures employed in the present invention can range from 1100° C. to 1550° C., more preferably between 1300° C. and 1500° C., and most preferably between 1350° C. and 1500° C. One particularly preferred sintering temperature is approximately 1490° C.

FIG. 3 illustrates a process which may be used to draw a core cane for use in the present invention. For example in one such embodiment, a soot preform is formed as described above with respect to FIG. 1, after which the soot preform is consolidated using conventional consolidation techniques (e.g., using consolidation temperatures of higher than 1300° C. in an atmosphere of 100 percent helium) to form a void free core preform. For example, in the case of a fiber preform which is to be used to make a pure silica core fiber, the core preform would consist of relatively pure silica with no significant index of refraction adjusting dopants. Alternatively, in the case of an optical fiber preform which is to be used to make a pure germania doped core fiber, the core preform could consist of a germania doped core region and optionally a portion of the cladding (e.g., undoped silica cladding). The resultant consolidated core blank 31 is placed in a core cane draw furnace 37 and at least one rod-shaped core cane segment 33 having a reduced outer diameter is drawn therefrom. The preform blank 31 is heated to a temperature of, for example, between about 1700° C. and 2000° C. The controls 38 control the tension applied to the cane by suitable control signals to a tension mechanism 40, shown here as two tractor wheels, to draw down the cane 33 at the proper speed. In this way, it is possible to derive a length of core cane 33 having an outer diameter dimension of for example between about 1 mm and 16 mm. This core cane can then be used as the target or mandrel 24 for additional soot deposition or as the rod in a rod in tube process.

Figure 4:
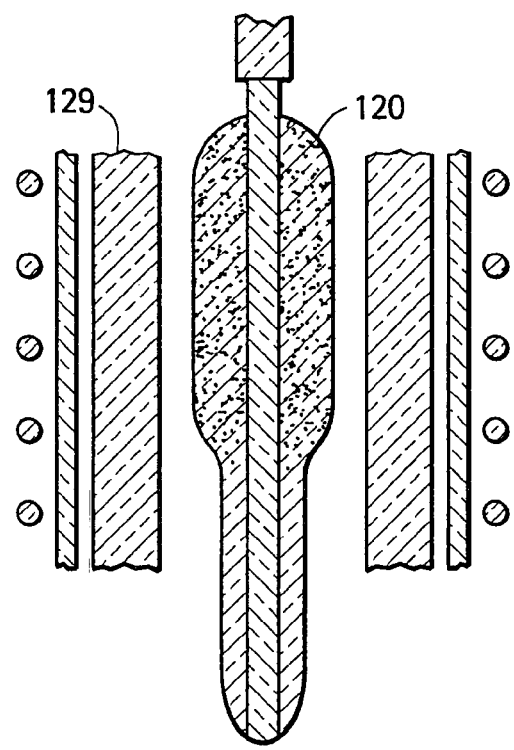
FIG. 4 illustrates consolidation of soot which has been deposited onto a core cane.

In one preferred embodiment, the process described above with respect to FIG. 3 can be used to form a core cane blank which can then be used as the target or mandrel for additional soot deposition which will be consolidated using the void forming techniques disclosed herein and thus eventually become the cladding of the optical fiber. In one such embodiment, for example, a fully consolidated, void free glass core cane can be used as the bait rod 24 in the soot deposition step illustrated in FIG. 1. The glass core cane may be undoped silica so the resultant optical fiber will be silica core fiber whose core consists essentially of pure silica. Alternatively, the core cane may consist of one or more doped regions which together form the light transmitting core region of the optical fiber. After the soot is deposited onto the glass core cane, the outer soot region 120 can be fully consolidated in consolidation furnace 129 as illustrated in FIG. 4. Preferably, during this consolidation step, the void forming consolidation process described above is carried out to form a consolidated optical fiber preform 150, as illustrated in FIG. 5.

As described above, preferred gases for use in the void forming consolidation step include at least one gas selected from the group consisting of nitrogen, argon, $CO_2$, oxygen, Chlorine, $CF_4$, CO, $SO_2$, Ne, krypton, and mixtures thereof. Preferably these void producing gases are employed either alone or in combination in an amount between 5 and 100 percent by volume, more preferably between about 20-100 percent by volume and most preferably between about 40 and 100 percent by volume. The remainder of the sintering gas atmosphere is made up of a suitable diluent or carrier gas such as, for example, helium, hydrogen, deuterium, or mixtures thereof. The most preferred diluent gas is He. Generally speaking, the greater the percentage of void producing gases (nitrogen, Ar, $CO_2$, Kr, $O_2$, $Cl_2$, $CF_4$, CO, $SO_2$, Ne, Kr) employed in the sintering gas, the larger and more abundant the voids will be in the resultant consolidated glass. One particularly preferred void producing gas is nitrogen, which is preferably employed in an amount greater that 10 percent by volume, more preferably greater than 30 percent by volume, even more preferably greater than about 50 percent by volume, and most preferably greater than about 65 percent by volume, with the remainder of the sintering atmosphere being a carrier gas such as, for example, helium. Voids can also be created by sintering the soot in a low permeability gas (e.g. nitrogen, argon, $CO_2$, oxygen, Chlorine, $CF_4$, CO, $SO_2$) under a partial vacuum (e.g., wherein the sintering atmosphere is at a pressure of between about 40 to 750 Torr), and in such cases use of a diluent relatively high permeability gas such as helium is not necessary. Using the void producing consolidation techniques disclosed herein, it is possible to make optical fibers whose cladding comprises a void containing region having a regional void area percent greater than 0.5 percent, more preferably greater than about 1, even more preferably greater than about 5 and most preferably greater than about 10 percent. Most preferably, the region having holes does not extend to the outer edge of the cladding such that there are open voids or holes on the outside of the fiber.

The sintering temperatures employed in the present invention preferably range from 1100° C. to 1550° C., more preferably between 1300° C. and 1500° C., and most preferably between 1350° C. and 1500° C. One preferred sintering temperature is approximately 1490° C. The gaseous atmosphere employed during the consolidation process, the temperature inside the consolidation furnace, and preform consolidation rate are selected so that, during the soot consolidation process, gases are intentionally trapped within the preform, forming holes in the consolidated glass. A variety of process parameters can be controlled to vary and control the size of the voids. For example, increasing the consolidation time or temperature can increase the void size, as the increased temperature causes the gases trapped within the voids to expand. Similarly, the size and area percent of the voids can be impacted by the draw conditions. For example, a longer hot zone in a draw furnace and/or faster draw speeds tend to increase the size as well as the area percent of the holes. Selection of a gas that is more permeable in glass at the consolidation temperature will result in smaller voids. Sintering rate can also have a significant effect on hole size and hole quantity. A faster sintering rate will result in the formation of more and larger voids. However, use of sintering rates that are too slow will result in no voids being formed, as the gas will have time to escape through the glass. Consequently, the downfeed rate of the preform and/or the consolidation temperature employed are preferably high enough to result in the heating of at least a portion of the preform at a rate greater than about 1° C./min and in some embodiments greater than about 10° C./min, more preferably greater than about 12° C./min, even more preferably greater than about 14° C./min. Generally speaking, an optical fiber preform having a lower soot density will result in formation of more voids. However, the density of the deposited soot in a particular optical fiber preform can be varied to position more holes (higher regional void area percent) where desired. For example, a first high density soot region can be deposited directly onto a consolidated glass (e.g. pure silica) core cane, followed by a second region of soot having a lower density than that of the first. We have found that this causes a higher void area percent to form near the core (i.e. in the high density soot region). The silica containing soot preferably has a bulk density of between about 0.10 g/cc and 1.7 g/cc, more preferably between about 0.30 g/cc and 1.0 g/cc. This effect can also be used to form consolidated void containing preforms which alternate between low or no void containing regions and higher void containing regions; wherein the initial soot density radial variation is greater than 3 percent over a distance of at least 100 microns. Such preforms can be used, for example, to make optical fibers having cladding regions which alternate between regions of void free glass and void containing glass. Fibers having such alternating void containing and void-free regions would exhibit properties useful as Bragg gratings.

Figure 5:
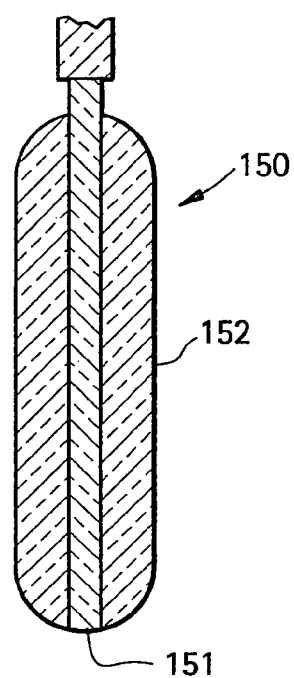
FIG. 5 illustrates the fully consolidated preform which results from the consolidation step illustrated in FIG. 4.

Referring to FIG. 5, using the techniques described above, an optical fiber preform 150 can be formed which comprises a void-free core region 151 which is surrounded by a cladding 152 which is comprised of a plurality of voids. By forming the void containing region in cladding 152 with a sufficient number of voids of an appropriate size, cladding 152 will serve as an optical cladding which guides light along core region 151 after the optical fiber preform is drawn into an optical fiber. The void containing region can be employed to improve the bend performance of the optical fiber. If desired, prior to drawing the preform 150 into an optical fiber, additional soot can be deposited over cladding region 152 and consolidated. The additional deposited cladding material may or may not be consolidated to contain voids, as desired.

Figure 6:
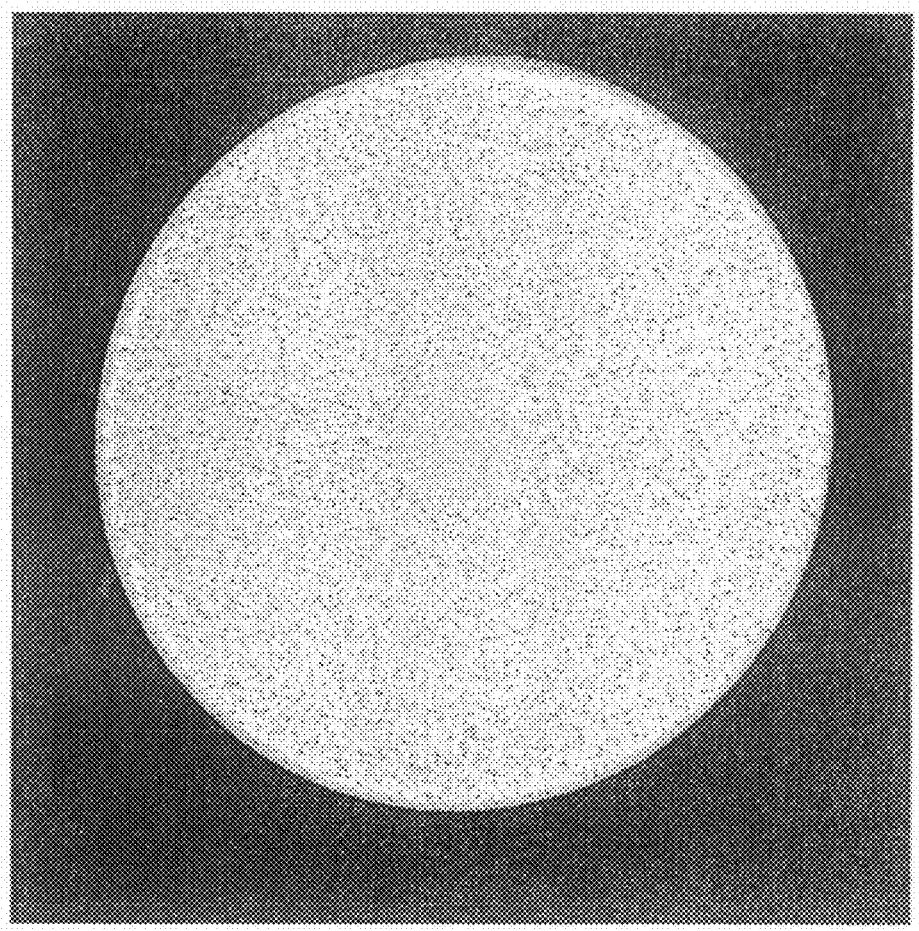
FIG. 6 illustrates a photograph of a cross-section of a fiber made with non-periodically distributed holes in the cladding.

A photograph of a cross-section of an example of a glass part of an optical fiber (i.e. without coating) which is drawn from such a preform is shown in FIG. 6. The optical fiber comprised a core region 170 and a cladding region 180, the cladding region comprising an inner annular portion 182, a ring portion or intermediate annular hole containing portion 184, and an outer annular portion 186. The ring portion 184 comprised non-periodically disposed holes. The core region 170, inner annular portion 182, and outer annular portion 186 were hole free. The fiber comprised a germania doped core region surrounded by a cladding region which comprises voids or holes which are positioned to be effective to guide light along the silica core.

Figure 7:
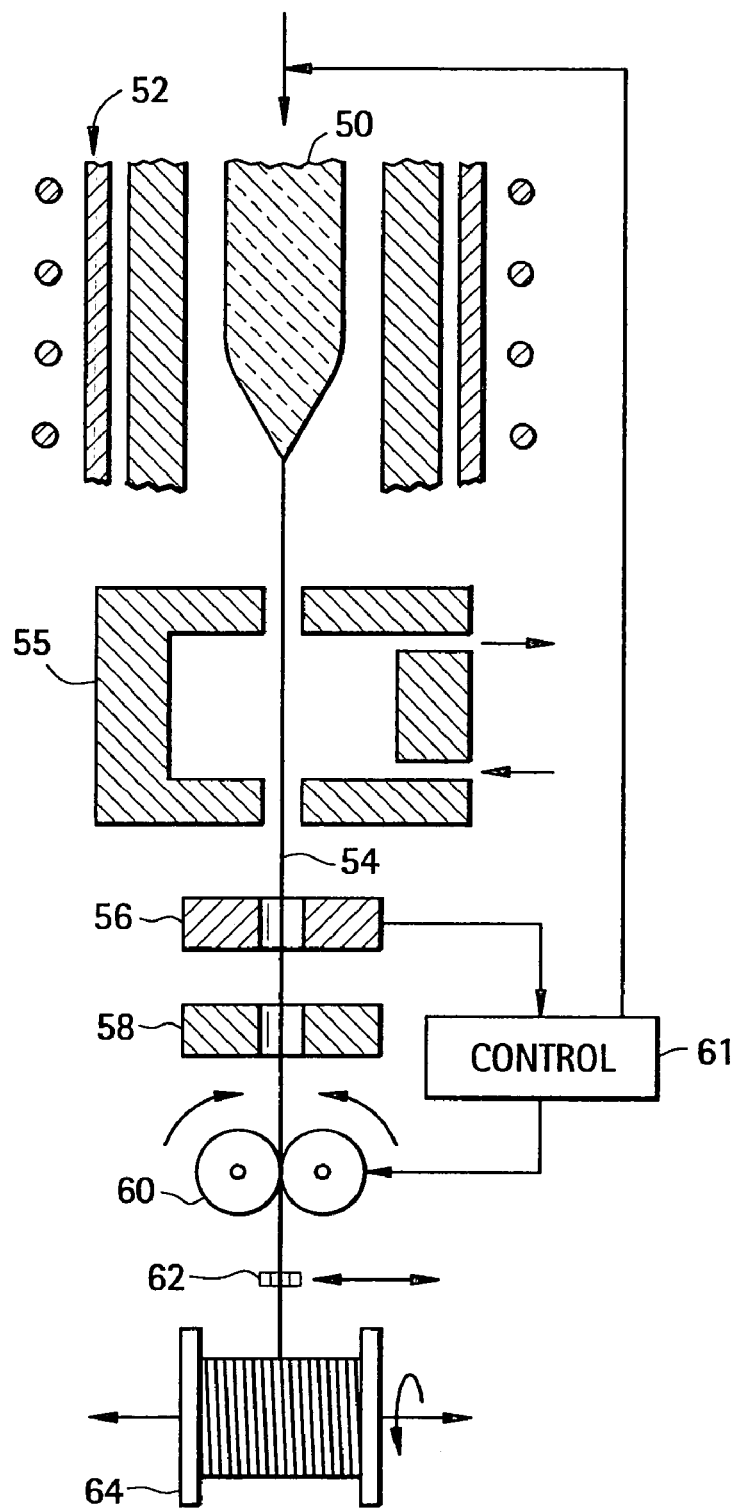
FIG. 7 illustrates a draw process and apparatus that may be employed in the method of the present invention.

In any of the embodiments disclosed herein, the resulting final consolidated optical fiber preform 50 may be drawn into an optical fiber by positioning the preform within a draw furnace 52 as shown in FIG. 7, and then heating and drawing the optical fiber 54 using conventional methods and apparatus. The fiber 54 is then cooled in cooling chamber 55 and measured for final diameter by non-contact sensor 56. One or more coatings may be applied and cured by coating apparatus 58. During draw, the fiber 54 passes through a tension assembly 60 whereby tension is applied to draw the fiber 54 from the preform 50. The tension is controlled via control apparatus 61 to maintain the fiber diameter at a predetermined set point. Finally, the coated fiber 54 is wound by feedhead 62 onto a fiber storage spool 64.

Using the techniques described herein, fibers can be made wherein the maximum size of any of the voids, in the region where the fraction of power of light is greater than 80 percent, is less than the wavelength of light being transmitted. By maximum size, we mean the maximum diameter of any particular void when the optical fiber is viewed in perpendicular cross-section transverse to the longitudinal axis of the fiber. For example, fibers have been made wherein the maximum size of all of said voids, in the region where the fraction of power of light is greater than 80 percent, and even more preferably in the region where the fraction of power of light is greater than 90 percent, is less than 5 microns, or less than 2 microns, or less than 1 micron, and even less than 0.5 microns. Using the techniques described herein, fibers can be made having void containing regions which exhibit regional void area percents of greater than 0.5 percent, and greater than 1 percent, and greater than 10 percent, and greater than 30 percent.

Index adjusting dopants such as germanium and fluorine can be used, if desired, either individually or together, to further adjust the refractive index of the core with respect to the index of refraction of the cladding or with respect to the index of refraction of pure silica. For example, in one such preferred embodiment, a germanium core cane is used as a starter rod, upon which additional soot cladding material is deposited, preferably using OVD deposition techniques as described above. The soot cladding region is then consolidated as described above to form a void containing cladding region around the germania doped silica core region. In another alternative embodiment involving index adjusting dopants, a silica core cane is employed as the starter rod for a soot cladding region. However, during the void producing consolidation step, in addition to the void producing dopant gas, a fluorine dopant source is provided (e.g. $SiF_4$ or $CF_4$ gas) to simultaneously dope the void containing region with fluorine. In this way, a fluorine doped void containing region can be formed around a silica core region.

Using the void producing consolidation techniques disclosed herein, it is possible to make optical fibers having cladding regions which exhibit a regional void area percent greater than 0.5 percent, or greater than about 1 percent, or greater than about 5 and even greater than about 10 percent. In particular, it is possible to produce such void containing cladding regions within a 5 micron or greater distance of the core of the optical fiber. While index of refraction adjusting dopants may be avoided using the techniques disclosed above, preferably at least one of germania or fluorine or a similar index of refraction adjusting dopant is employed outside the hole-containing region together with the non-periodically distributed voids located in the cladding region of the optical fiber.

While the fibers are not limited to any particular diameter, the outer diameter of the fiber in some preferred embodiments is between 120 and 130 microns, more preferably about 125 microns.

The optical fiber disclosed herein can be used in telecommunication networks (typically operating in 850, 1310 and/or 1550 nm windows) including long-haul, metro, access, premise and data centers as well as data communication applications and control area networks within buildings and mobile (auto, bus, train, plane) applications (typically 600 to 1000 nm range). Such telecommunications networks typically include a transmitter and receiver which is optically connected to the optical fiber. Consequently, for a variety of applications, it is desirable for the holes to be formed such that the maximum hole size in the cladding for the optical fiber is less than 1550 nm, more preferably less than 775 nm, most preferably less than about 390 nm.

The fibers disclosed herein are preferably capable of superior bend resistance compared to fibers of the prior art while simultaneously exhibiting excellent mode field diameters. By superior, we mean that using the methods disclosed herein, it is possible to make fibers which are single molded at 1550 nm and capable of less than 0.5 dB attenuation increase at 1550 nm per turn for a 20 mm diameter bend while simultaneously exhibiting mode field diameters greater than 9 microns, and more preferably greater than 10 microns, at 1550 nm. The mode field diameter (MFD) is measured using the Peterman II method wherein, 2w=MFD, and $w^2=(2\int f^2 r\, dr/\int [df/dr]^2 r\, dr)$, the integral limits being 0 to $\infty$.

Such excellent bend performance makes these fibers attractive candidates for fiber-to-the-home, access fiber, fiber-in-the-home applications, and fiber jumpers (typically short sections of fiber, about 1 to 20 meters, with connectors on each end to connect to an optical system or device). For example, the fibers disclosed herein may be employed in an optical fiber telecommunications system comprising a transmitter, a receiver, the fiber(s) being optically connected to said transmitter and receiver.

Using the void producing consolidation techniques disclosed herein, it is possible to make optical fibers having cladding regions which exhibit a total void area percent (i.e., total cross-sectional area of the voids divided by total cross-sectional area of the optical fiber×100) greater than 0.05 percent, or greater than about 0.1 percent and even greater than about 0.5 percent. Fibers have been made having total void area percents greater than about 1, and in fact even greater than about 5 or even 10 percent. Void containing cladding regions, particularly generally annular regions, can be used to guide light along the core of the optical fiber. By selecting the appropriate soot consolidation conditions, as will be described below, a variety of useful optical fiber designs can be achieved. For example, by selecting the maximum void size in the cladding to be less than that of the wavelength of light which is to be transmitted (for example, less than 1550 nm for some telecommunications systems), and preferably less than one half of the wavelength of light which is to be transmitted along the fiber, low attenuation fibers can be achieved without having to use expensive dopants. Consequently, for a variety of applications, it is desirable for the holes to be formed such that at least greater than 95% of and preferably all of the holes exhibit a mean hole size in the cladding for the optical fiber which is less than 1550 nm, more preferably less than 775 nm, most preferably less than about 390 nm, and likewise, it is preferable that the maximum diameter of the holes in the fiber be less than 7000 nm, and in some embodiments more preferably less than 2000 nm, and even more preferably less than 1550 nm, and most preferably less than 775 nm, all of which diameters are achievable using the methods disclosed herein. In some embodiments, the fibers disclosed herein have less than 5000 holes, in some embodiments less than 1000 holes, and in some embodiments the total number of holes is less than 500 holes in a given optical fiber perpendicular cross-section. The hole number, mean diameter, max diameter, and total void area percent of holes can all be calculated with the help of a scanning electron microscope at a magnification of about 800× and image analysis software, such as ImagePro, which is available from Media Cybernetics, Inc. of Silver Spring, Md., USA.

The optical fiber disclosed herein may or may not include germania or fluorine to also adjust the refractive index of the core and or cladding of the optical fiber. The hole-containing region may consist of undoped (pure) silica, thereby completely avoiding the use of any dopants in the hole-containing region, to achieve confinement and guidance of desired modes of light within the core region, or the hole-containing region may comprise doped silica, e.g. fluorine-doped silica having a plurality of holes.

In one set of embodiments, the core region includes doped silica to provide a positive refractive index relative to pure silica, e.g. germania doped silica. The core region is preferably hole-free. In some embodiments, the core region comprises a single core segment having a positive maximum refractive index relative to pure silica $\Delta_1$ in %, and the single core segment extends from the centerline to a radius $R_1$. In one set of embodiments, $0.30\% < \Delta_1 < 0.40\%$, and $3.0\,\mu m < R_1 < 5.0\,\mu m$. In some of these embodiments, the single core segment has a refractive index profile with an alpha shape, where alpha is 6 or more, and in some embodiments alpha is 8 or more.

Preferably, the optical fiber disclosed herein further comprises a coating surrounding and directly adjacent the cladding region. In preferred embodiments, the optical fiber comprises a single coating layer surrounding and directly adjacent the cladding region.

In some embodiments, at least some of the holes contain at least one gas selected from the group consisting of argon, nitrogen, carbon monoxide, carbon dioxide, chlorine, oxygen, $CF_4$, $C_2F_6$, $SO_2$, Ne, Kr, and mixtures thereof.

In some embodiments, the coating is formed from a cured polymeric material. The coating preferably has sufficient stiffness to protect the optical fiber; is flexible enough to be handled, bent, or spooled; has low tackiness to enable handling and prevent adjacent convolutions on a spool from sticking to one another; is resistant to water and chemicals such as optical fiber cable filling compound; and has the desired adhesion to the surface to which it is applied. In some embodiments, the cured polymeric materials used in the coating are the cured product of a curable composition including an oligomer and at least one monomer. The oligomer is selected to provide a high ductility and a high Young's modulus to the cured polymeric material. The curable compositions also include one or more monomers having reactive termini selected to react with the reactive termini of the oligomer. In general, individual monomers capable of greater than about 80% conversion are more desirable than those having lower conversion rates. The degree to which monomers having low conversion rates can be introduced into the curable composition depends upon the particular requirements of the desired cured polymeric material. Typically, higher conversion rates will yield stronger cured products.

In some preferred embodiments, the coating comprises 10 wt % KWS 4131 (oligomer) available from Bomar Specialty Co., 82 wt % Photomer 4028 (monomer) available from Cognis, 5 wt % Photomer 3016 (monomer) available from Cognis, 1.5 wt % Lucerin TPO (photoinitiator) available from BASF, 1.5 wt % Irgacure 184 (photoinitiator) available from Ciba Specialty Chemical (Hawthorne, N.Y.), 0.5 pph Irganox 1035 (antioxidant) available from Ciba, which has a Young's modulus of about 1500MPa and a glass transition temperature (Tg) of about 55° C.

Additional coatings can be found in PCT Publication WO2005/010589 which is incorporated herein by reference in its entirety.

EXAMPLES

The invention will be further illustrated by the following examples.

Example 1

4600 grams of $SiO_2$ (0.42 g/cc density) soot were deposited via OVD onto a fully consolidated 1 meter long×10 mm diameter glass cane with a step index profile with a $GeO_2$—$SiO_2$ core region extending to a radius of 1.65 mm and having a maximum 0.35 percent delta, the $GeO_2$—$SiO_2$ core-$SiO_2$ region being surrounded by an undoped $SiO_2$ region, thereby resulting in a preform comprising a consolidated $GeO_2$—$SiO_2$ core region which was surrounded by a consolidated silica region which in turn was surrounded by a soot silica region. The soot cladding of this assembly was then sintered as follows. The assembly was first dried for 2 hours in an atmosphere consisting of helium and 3 percent chlorine at 1000° C. followed by down driving at 6 mm/min through a hot zone set at 1500° C. in a 100% oxygen (by volume) atmosphere, corresponding to a 3° C./minute temperature increase for the outside of the soot preform during the down drive process, in order to sinter the soot to an oxygen-seeded overclad blank, or optical fiber preform. The blank was placed for 24 hours in an argon purged holding oven set at 1000° C. to outgas the helium from the blank.

The optical fiber preform was drawn to 125 micron diameter fiber at 18-20 meters/second in a furnace having an 8" long hot zone set at 2000° C. A photograph of a cross-section of the resultant optical fiber (without coating) is shown in FIG. 6. The germania doped ($GeO_2$—$SiO_2$) core region had a maximum refractive index relative to pure silica of 0.35%, and the refractive index profile of the core had a rounded step, or step-index, shape. SEM analysis of the end face of the fiber showed an approximately 4 micron radius $GeO_2$—$SiO_2$ center core region surrounded by an approximately 12 micron outer radius void-free near clad region surrounded by an approximately 18 micron outer radius void containing cladding region which is surrounded by a void-free pure silica outer cladding having an outer diameter of 125 microns (all radial dimensions measured from the center of the optical fiber). The void containing ring region comprised 4.2 percent regional area percent holes (100 percent $O_2$ by volume) in that area with an average diameter of 0.53 microns and the smallest diameter holes at 0.18 microns and a maximum diameter of 1.4 microns, resulting in about 85 total number of holes in the fiber cross-section. Because of the relatively slow downdrive and sinter rate, the holes were located adjacent to the region corresponding to where the $GeO_2$—$SiO_2$ core-$SiO_2$ clad core cane was during consolidation and extending out from a radial distance from the fiber centerline of 12 microns to about 18 microns radial distance across the fiber cross-section. The total fiber void area percent (area of the holes divided by total area of the optical fiber cross-section×100) was about 0.21 percent.

Figure 8:
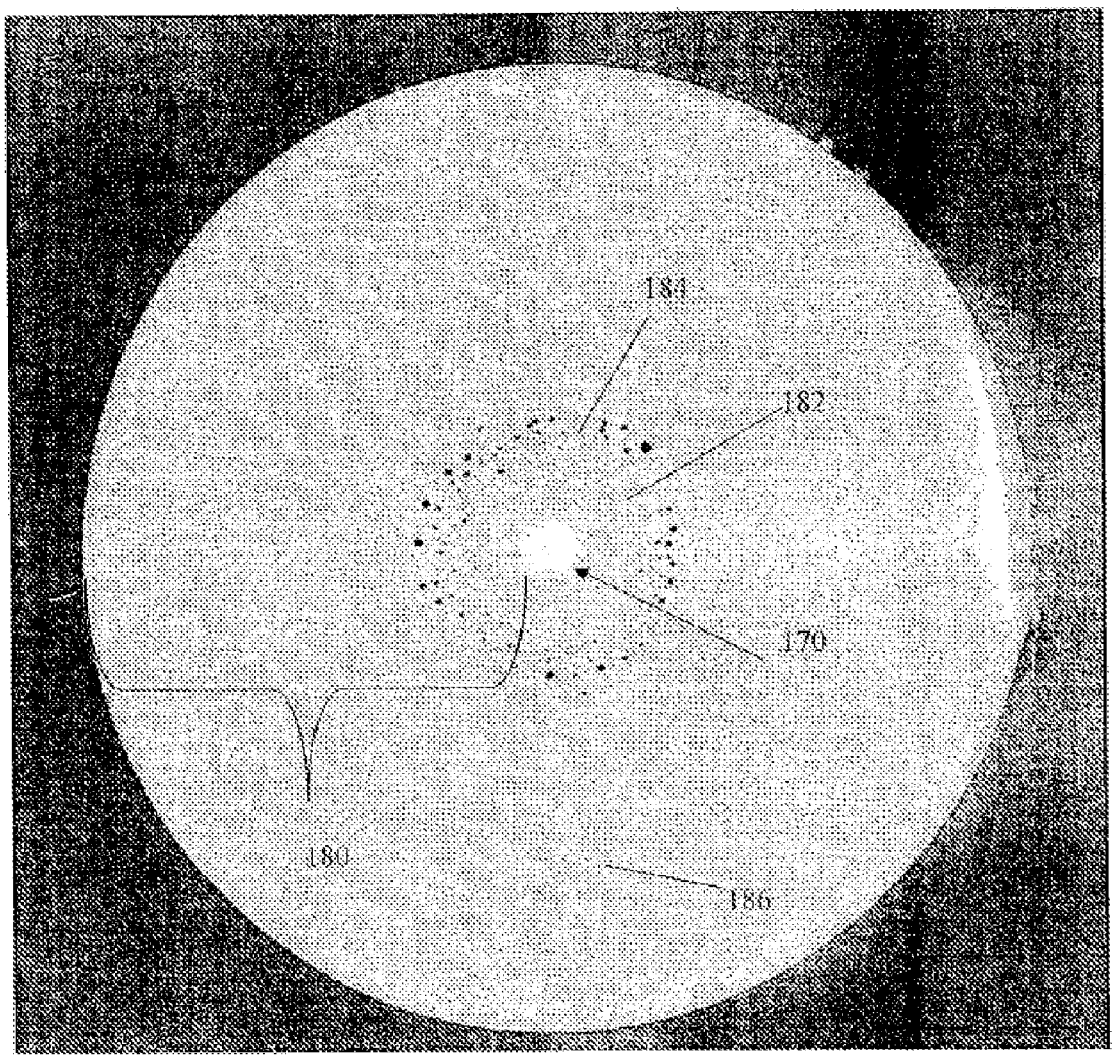
FIG. 8 illustrates a photograph of a cross-section of a fiber made in accordance with one embodiment of the invention, shown without coatings.
Figure 9:
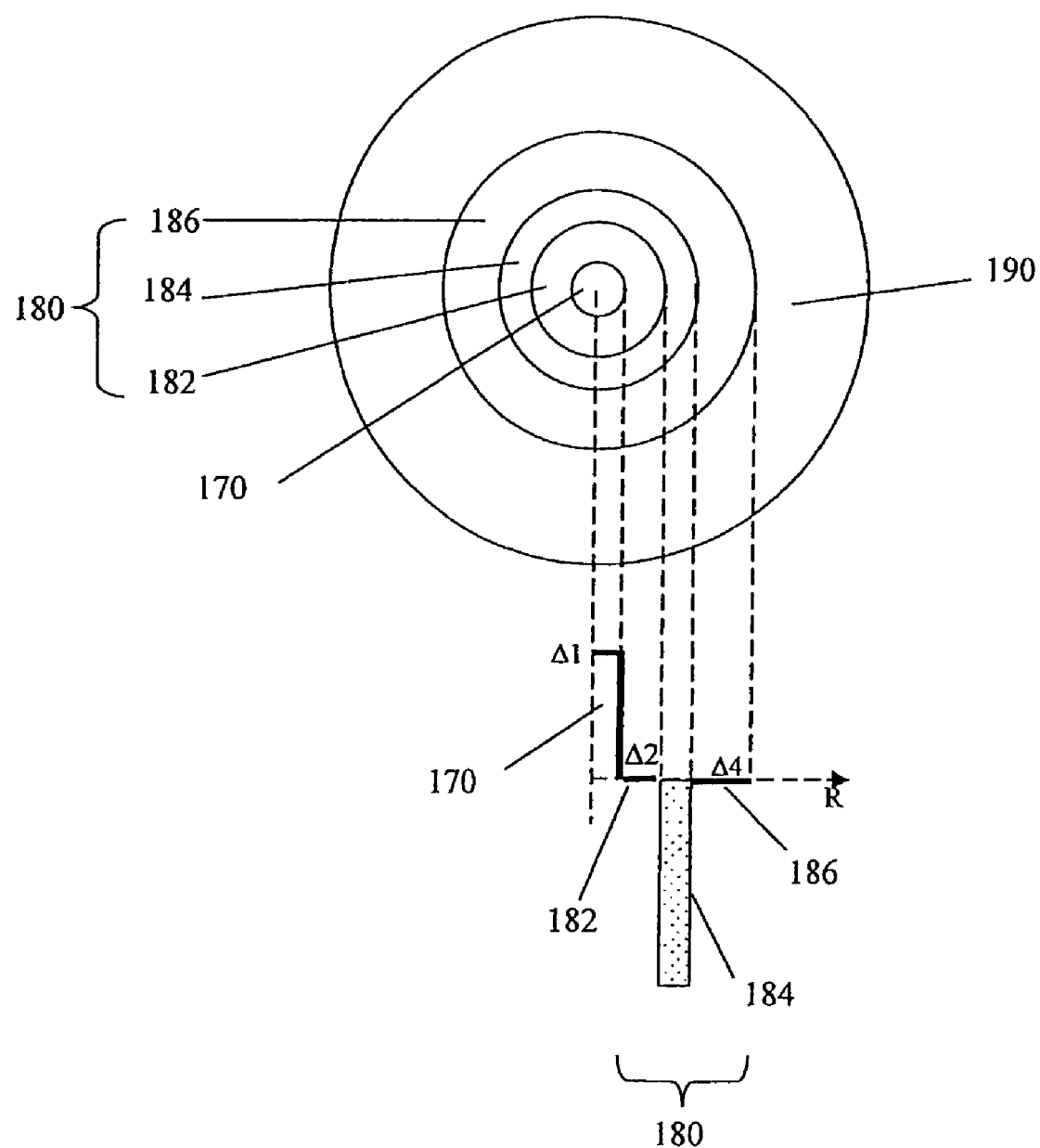
FIG. 9 schematically illustrates a cross-section of an optical fiber made in accordance with the invention, shown with a coating.

A 10 km length of the optical fiber (shown in FIG. 8 without any coating) was coated during the draw process with a single layer of UV cured urethane acrylate based coating having a Young's modulus of 1000 MPa. FIG. 9 schematically illustrates the fiber with a coating 190. The coating 190 surrounded and contacted the outer periphery of the cladding, i.e. the outermost diameter of the glass part of the fiber, and had a radial thickness of approximately 60 microns from the outer edge of the glass fiber to the outermost portion of the coating 190. This example is one representative of the first aspect of optical fibers disclosed herein. The measured spectral attenuation for this fiber was 0.335 and 0.203 dB/Km at 1310 and 1550 nm, respectively.

Comparative Example 1

Instead of the single coating of Example 1, a 10 km length of the optical fiber (shown in FIG. 8 without any coating) was coated with two coatings during draw: a single layer of UV cured urethane acrylate based primary coating having a Young's modulus of 1.2 MPa which surrounded and contacted the outer periphery of the glass cladding and had a radial thickness of approximately 40 microns from the outer edge of the glass fiber to the outermost portion of the primary coating, and a single layer of UV cured urethane acrylate based secondary coating having a Young's modulus of 1000 MPa surrounded and contacted the outer periphery of the primary coating and had a radial thickness of approximately 20 microns from the outer edge of the primary coating to the outermost portion of the secondary coating. The measured spectral attenuation for this fiber was 0.385 and 0.237 dB/Km at 1310 and 1550 nm, respectively. The dual coating fiber of Comparative Example 1 had higher attenuation at 1310 nm and at 1550 nm compared to the single coating fiber of Example 1.

Comparative Example 2

A 10 km length of Corning Incorporated's SMF-28e® optical fiber, having a core similar to the core in Example 1 but having a pure silica cladding with no holes, was coated with a single layer of UV cured urethane acrylate based coating having a Young's modulus of 1000 MPa. The coating surrounded and contacted the outer periphery of the glass cladding and had a radial thickness of approximately 60 microns from the outer edge of the glass fiber to the outermost portion of the coating.

Comparative Example 3

A 10 km length of Corning Incorporated's SMF-28e® optical fiber having a core similar to the core in Example 1 but having a pure silica cladding with no holes was coated with two coatings: a single layer of UV cured urethane acrylate based primary coating having a Young's modulus of 1.2 MPa which surrounded and contacted the outer periphery of the glass cladding and had a radial thickness of approximately 40 microns from the outer edge of the glass fiber to the outermost portion of the primary coating, and a single layer of UV cured urethane acrylate based secondary coating and having a Young's modulus of 1000 MPa which surrounded and contacted the outer periphery of the primary coating and had a radial thickness of approximately 20 microns from the outer edge of the primary coating to the outermost portion of the secondary coating.

The optical fibers of Example 1 and Comparative Examples 2-3 were subjected to a mandrel wrap tests to evaluate losses induced by macrobending of the fiber, and to a lateral load wire mesh test to evaluate losses induced by microbending of the fiber.

The mandrel wrap test was used to determine the relative susceptibility to macrobend induced losses of optical fibers. Samples of the optical fiber were wrapped at least one turn around various mandrels having various respective diameters, such as 20, 12.66, 10, and 6.33 mm diameters, and increases in spectral attenuation were measured.

Figure 10:
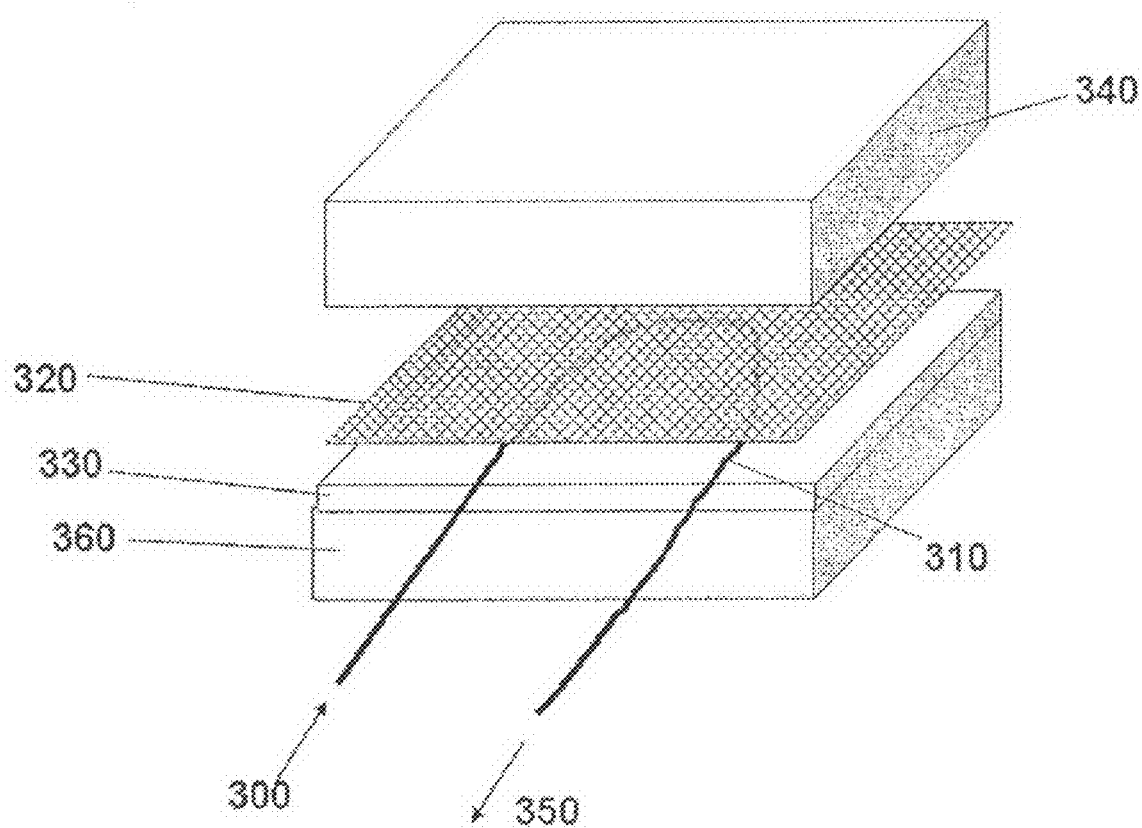
FIG. 10 schematically shows a test set up for making microbend induced attenuation measurements.

A lateral load wire mesh test was used to determine the relative susceptibility to microbend induced losses of optical fibers. Transmitted power of a fiber was measured while a compressive lateral load using a wire mesh was used to induce microbends in a loop of fiber. The test can be used to distinguish changes in the microbend sensitivity of an optical fiber due to changes in the glass design and/or coating. Referring to the simplified schematic representation in FIG. 10, the test set up consisted of a PK2500 spectral bench for measuring the power transmitted 300 to the fiber under test 310, a piece of wire mesh 320, a piece of silicone rubber sheet 330, and a number of metal plates of known mass 340. The output power 350 was detected. The following items were used for the test: a Photon Kinetics PK2500 bench available from PK Technology, 9405 SW Gemini Dr., Beaverton, Oreg. 97008; galvanized steel standard grade woven wire cloth from McMaster-Carr Supply Company of New Brunswick, N.J., part# 9220T333, 6×6 mesh per length in inches, wire diameter 0.20 inch, width open 0.147 inch; and a ⅛×12×12 inch silicone rubber sheet, part# 8632K44, Durometer hardness of 70A±5. A 6×6 inch piece of the silicone rubber sheet was placed on the steel base plate test platform 360 of the PK2500 bench. The silicone rubber sheet had a 100 mm diameter U shaped loop traced on its surface. The total length of the traced loop was 300 mm which corresponded to the length of fiber under test. Approximately 2-3 meters of the fiber to be tested was removed from a fiber reel. Each end of the fiber was stripped, cleaved and connected to the PK2500 bench. The fiber was then placed on the silicone sheet carefully following the traced fiber path. Any remaining fiber was loosely coiled (>100 mm dia.) near the detector side on the PK2500's test platform. If needed 2 small pieces (¼×¼ inch ) of tape were used to hold the fiber in position. The 6×6 inch wire mesh was positioned over the silicone sheet and placed on the loop of fiber aligning the wire mesh with the silicone rubber sheet. Thus, the wire mesh is placed on top of the loop of fiber such that the loop of fiber is sandwiched in between the silicone mat and the wire mesh.

Using the SPECCUT recipe on the PK2500 and following the measurement SOP, the initial transmitted power was measured. The load was applied by placing a number of plates of known mass on top of the wire mesh, forming another level in the sandwich. The plates were about 5" wide and 10" long. Five (5) plates were used which totalled 3.18 kg. Not all of the wire mesh was covered by the plates, i.e. 0.5" on each side of the wire mesh and the silcone mat were not covered by the applied load of the plates. Thus, the load was applied to the wire mesh ensuring that the fiber under test on the measurement bench was beneath the load. Care was exercised when placing the load on the mesh so as not to slide the plates to help prevent misalignment or damage to the fiber under test. Spectral measurements were taken, plotted, and saved to a computer file. Once the measurement was complete, the load and wire mesh were removed. The next section of fiber (from the fiber coil made earlier) was re-loaded onto the rubber sheets as already described. The measurement was repeated at least five times on a new section of fiber (from the same reel) each time. The average of the five measurements was then used as the lateral load microbend loss.

Figure 11:
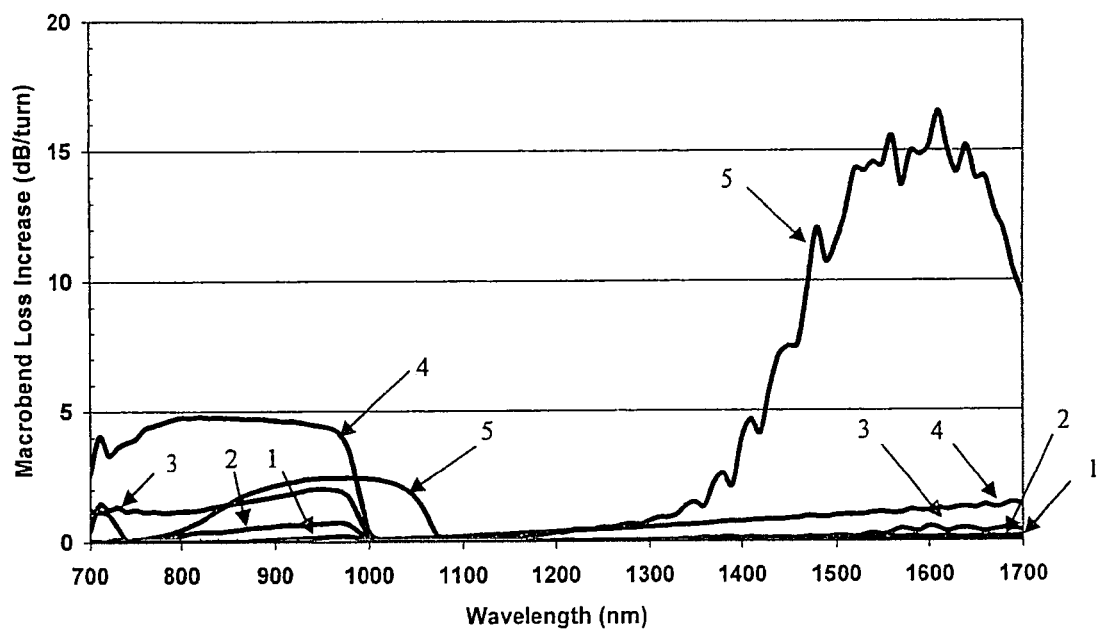
FIG. 11 shows measured macrobend loss of a first comparative example and a third comparative example, each fiber having two coatings.
Figure 12:
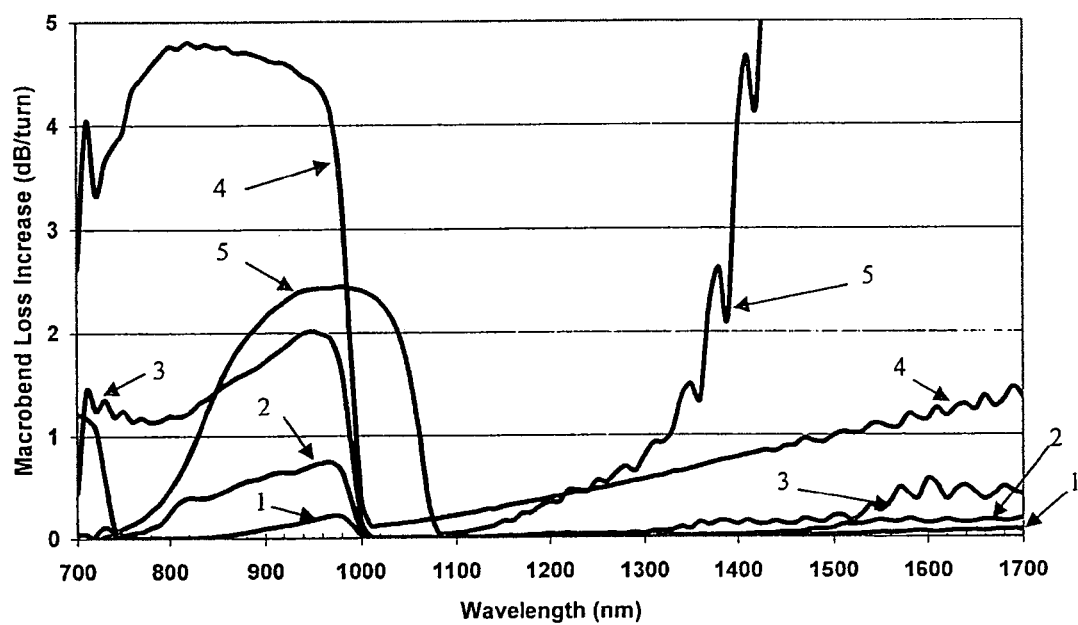
FIG. 12 is an enlarged view of a portion of FIG. 11.

FIGS. 11 and 12 show the macrobend induced loss for the optical fiber of Comparative Example 1 (2 coatings) when wrapped 5 turns around a 20 mm diameter mandrel (curve 1), 2 turns around a 12.66 mm diameter mandrel (curve 2), 1 turn around a 10 mm diameter mandrel (curve 3), and 1 turn around a 6.33 mm diameter mandrel (curve 4). FIGS. 11-12 also show the macrobend induced loss for the optical fiber of Comparative Example 3 (2 coatings) when wrapped 2 turns around a 12.66 mm diameter mandrel (curve 5).

Figure 13:
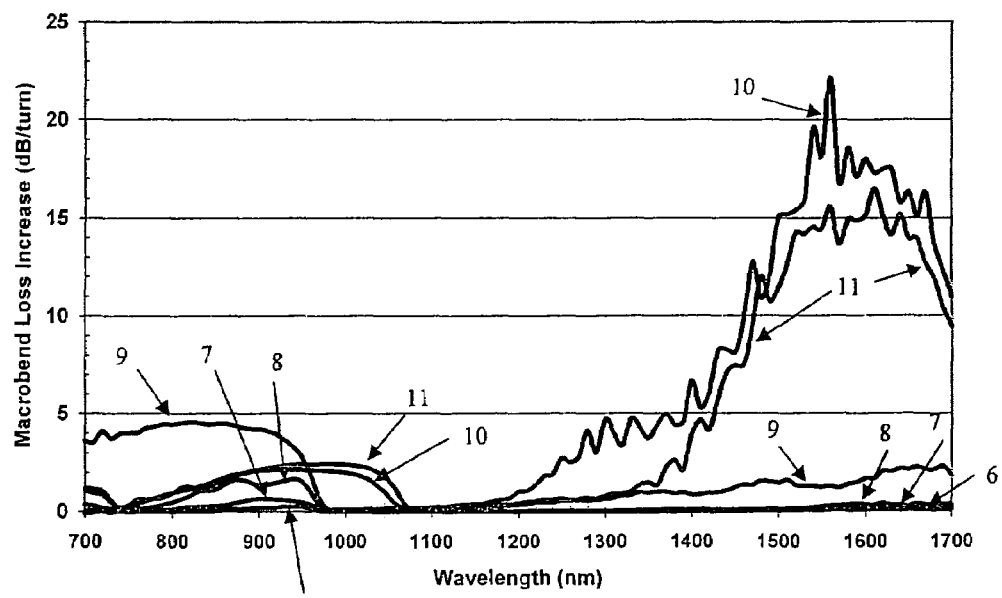
FIG. 13 shows measured macrobend loss of the first embodiment disclosed herein and a second comparative example, each fiber having a single coating.
Figure 14:
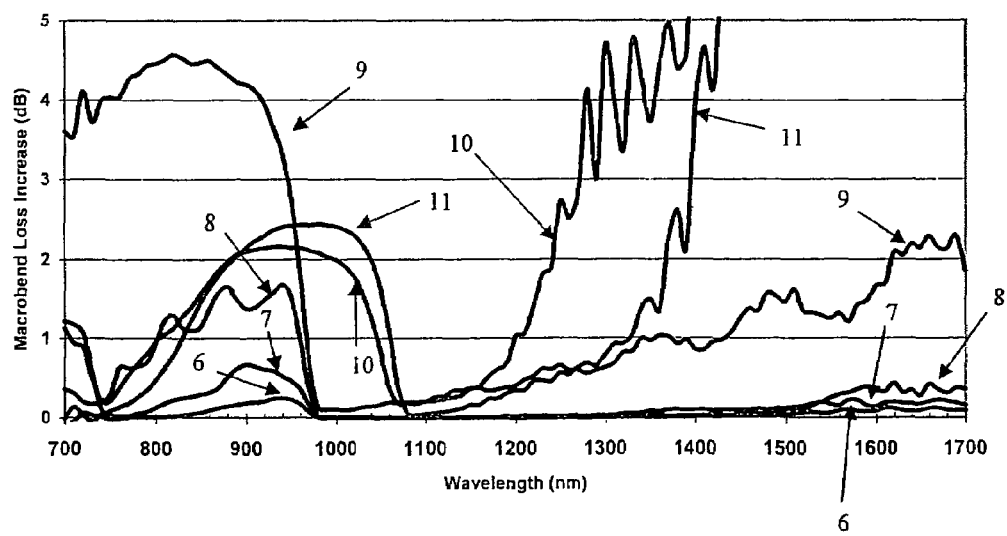
FIG. 14 is an enlarged view of a portion of FIG. 13.

FIGS. 13-14 show the macrobend induced loss for the optical fiber of Example 1 (1 coating) when wrapped 5 turns around a 20 mm diameter mandrel (curve 6), 2 turns around a 12.66 mm diameter mandrel (curve 7), 1 turn around a 10 mm diameter mandrel (curve 8), and 1 turn around a 6.33 mm diameter mandrel (curve 9). FIGS. 13-14 also show the macrobend induced loss for the optical fiber of Comparative Example 2, with 1 coating, when wrapped 2 turns around a 12.66 mm diameter mandrel (curve 10). FIGS. 13-14 also show the macrobend induced loss for the optical fiber of Comparative Example 3, with 2 coatings, when wrapped 2 turns around a 12.66 mm diameter mandrel (curve 11).

As illustrated by FIGS. 13-14, the optical fiber disclosed herein (such as Example 1) has a 10 mm diameter bend induced loss of less than 5 dB/turn, preferably less than 2 dB/turn, at a wavelength of 1550 nm. More preferably, the optical fiber has a 10 mm diameter bend induced loss of less than 5 dB/turn, even more preferably less than 2 dB/turn, for all wavelengths between 1250 and 1700 nm.

Even more preferably, the optical fiber disclosed herein has a 6.33 mm diameter bend induced loss of less than 5 dB/turn, still more preferably less than 2 dB/turn, at a wavelength of 1550 nm. Yet more preferably, the optical fiber has a 6.33 mm diameter bend induced loss of less than 5 dB/turn, even more preferably less than 2 dB/turn, for all wavelengths between 1250 and 1700 nm.

The optical fibers of Example 1 and Comparative Examples 1-3 were subjected to a wire mesh lateral load test to evaluate microbend induced losses.

Figure 15:
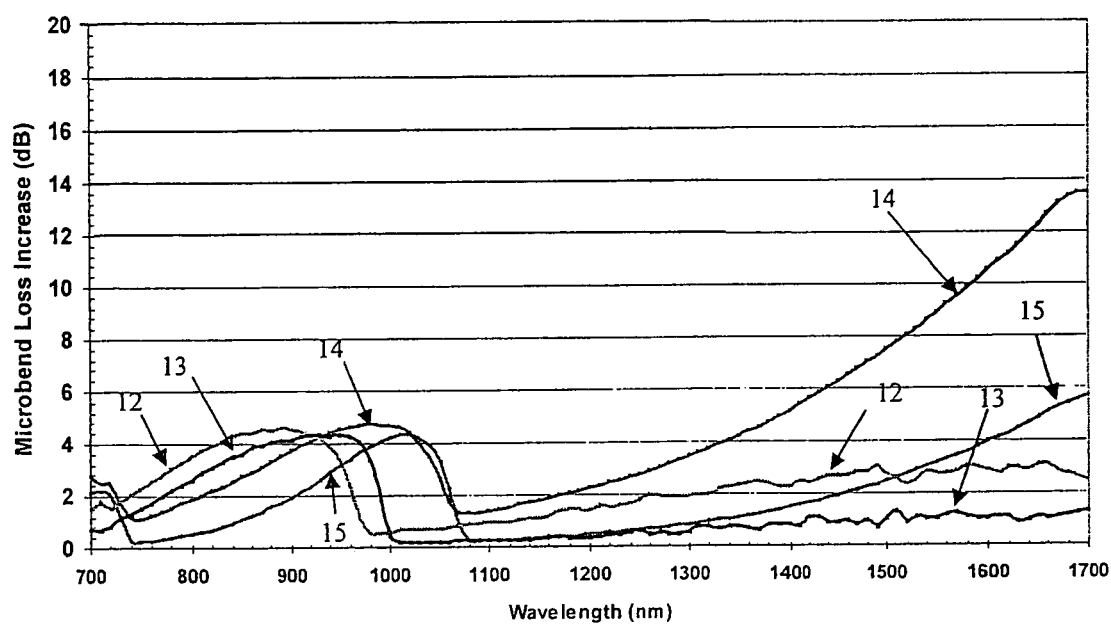
FIG. 15 shows measured microbend loss for the first embodiment, and first, second and third comparative examples.

FIG. 15 shows the microbend induced loss for the optical fiber of Example 1 (curve 12), Comparative Example 1 (curve 13), Comparative Example 2 (curve 14), and Comparative Example 3 (curve 15). Example 1, with only a single coating, had a microbend induced loss at 1550 nm which was lower than Comparative Example 3, which even had two coatings, both a primary coating (specifically provided to reduce microbend losses) and a surrounding secondary coating. On the other hand, Comparative Example 2, with only a single coating, had a microbend induced loss at 1550 nm which was more than double the loss at 1550 nm for Comparative Example 3. As measured by the lateral load wire mesh test, Example 1 exhibited a microbend induced loss of less than about 4 dB and no more than about 3 dB at a wavelength of 1550 nm, and a microbend induced loss of less than 5 dB at a wavelength of 1625 nm, and a microbend induced loss of less than 5 dB for all wavelengths between 1250 and 1700 nm.

Thus, hole-assisted fibers with only one coating (i.e. no primary coating) showed better bend performance than known conventional fibers with similar cores but which had the standard two coatings (primary and secondary), for example for wavelengths from 1500 nm to 1600 nm.

Example 4

Figure 16:
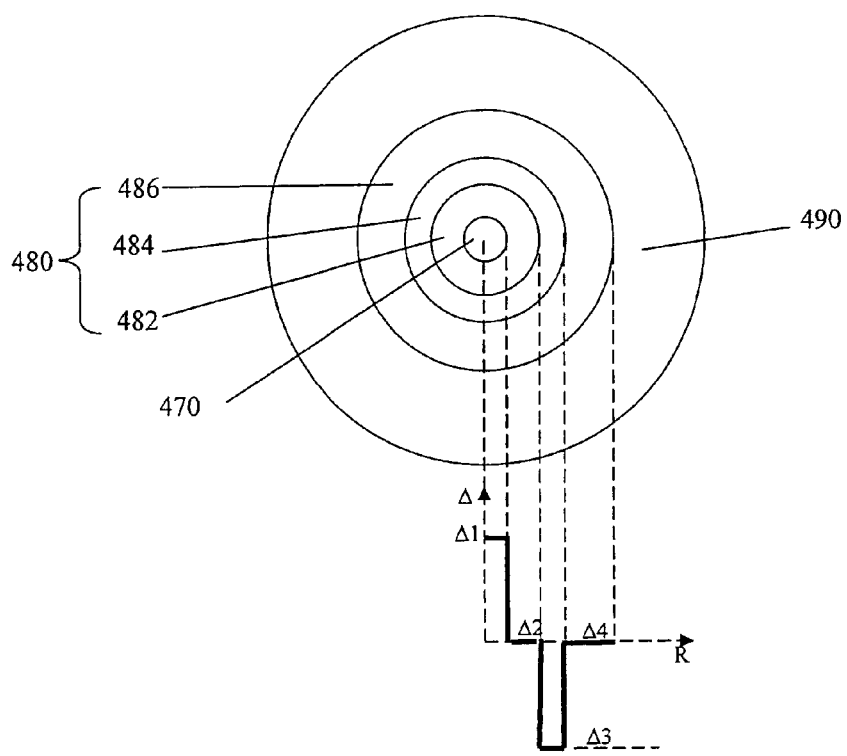
FIG. 16 schematically illustrates a cross-section of a second embodiment disclosed herein.

An optical fiber representative of the second aspect of optical fibers disclosed herein was fabricated using outside vapor deposition. As schematically illustrated in FIG. 16 the fiber had a void-free $GeO_2$—$SiO_2$ center core region 470 having a step index shape refractive index profile with a maximum +0.35% delta index Δ1, relative to pure silica, the center core region extending out to a radius of about 4 microns, the center core region being surrounded and in contact with a void free inner annular region 482 comprising a second maximum relative refractive index Δ2 and consisting of pure silica extending out to a radius of about 12 microns, which in turn was surrounded by and in contact with a void free intermediate annular region 484 comprising a minimum refractive index ΔMIN and consisting of fluorine doped silica extending out to a radius of about 17 microns and which had a minimum relative refractive index of −0.45% (relative to pure silica), which in turn was surrounded by and in contact with a void free outer annular region 486 comprising a third maximum relative refractive index Δ3 and consisting of pure silica and having an outer diameter of 125 microns. Thus, Δ1>Δ2>ΔMIN, and Δ3>ΔMIN, and Δ1>Δ3, wherein the outer annular portion comprises an outermost glass periphery. The fiber was coated with a single layer of UV cured urethane acrylate based coating 490 having a Young's modulus of 1000 MPa. The coating surrounded and contacted the outer periphery of the cladding 480 and had a radial thickness of approximately 60 microns from the outer edge, or outermost diameter, of the glass part of the fiber to the outermost portion of the coating 490. In the embodiment illustrated in FIG. 16, Δ2 is substantially equal to Δ3, the inner annular portion is hole-free, the ring portion comprises holes, and the outer annular portion is hole-free.

The optical fiber of Example 4 was subjected to a wire mesh lateral load test to evaluate microbend induced losses.

Figure 17:
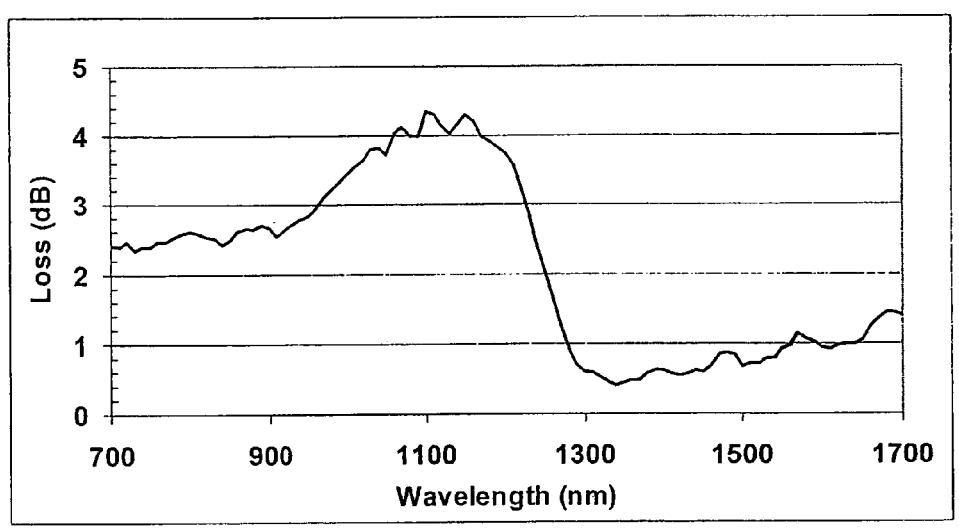
FIG. 17 shows measured microbend loss for the embodiment of FIG. 16.

FIG. 17 shows the microbend induced loss for the optical fiber of Example 4. As measured by the lateral load wire mesh test, Example 4, with only a single coating, exhibited a microbend induced loss of less than 1 dB at a wavelength of 1550 nm, and a microbend induced loss of less than 1.5 dB at a wavelength of 1625 nm, and a microbend induced loss of less than about 3 dB for all wavelengths between 1250 and 1700 nm.

In some embodiments of the optical fiber disclosed herein, the optical fiber has a 10 mm diameter bend induced loss of less than 5 dB/turn at a wavelength of 1550 nm; in other embodiments, the optical fiber has a 10 mm diameter bend induced loss of less than 2 dB/turn at a wavelength of 1550 nm.

In some embodiments of the optical fiber disclosed herein, the optical fiber has a 10 mm diameter bend induced loss of less than 5 dB/turn for all wavelengths between 1250 and 1700 nm; in other embodiments, the optical fiber has a 10 mm diameter bend induced loss of less than 2 dB/turn for all wavelengths between 1250 and 1700 nm.

In some embodiments of the optical fiber disclosed herein, the optical fiber has a 6.33 mm diameter bend induced loss of less than 5 dB/turn at a wavelength of 1550 nm; in other embodiments, wherein the optical fiber has a 6.33 mm diameter bend induced loss of less than 2 dB/turn at a wavelength of 1550 nm.

In some embodiments of the optical fiber disclosed herein, the optical fiber has a 6.33 mm diameter bend induced loss of less than 5 dB/turn for all wavelengths between 1250 and 1700 nm; in other embodiments, the optical fiber has a 6.33 mm diameter bend induced loss of less than 2 dB/turn for all wavelengths between 1250 and 1700 nm.

In some embodiments, the coating is a polymeric coating. In some embodiments, the coating comprises a material selected from the group consisting of urethane acrylates, acrylates, silicone polymers, epoxy polymers, polyolefins, PVC., and polyamides. Examples of coating materials that may be utilized in making the optical fiber disclosed herein are disclosed in U.S. Pat. Nos. 6,596,394, 6,377,724, 6,733,824, and 6,767,579, which are incorporated herein by reference in their entirety. In some embodiments coating thicknesses can range from 2 nm to 2 mm.

In some embodiments, the optical fiber disclosed herein comprises a polymer coating that does not bind well to the glass cladding of the fiber. Known optical fiber with a polymer coating typically does not have release agents and, in fact, adhesion promoters such as epoxy silanes or acrylate silanes or sulfur containing silanes are typically added to the polymer coating formulations to prevent the coating from delaminating from the optical fiber, which also tends to have the effect of making the coating more difficult to remove. However, some embodiments of the optical fiber disclosed herein have a coating, surrounding and in contact with the glass part of fiber, which contains no adhesion promoter, and some embodiments of the optical fiber disclosed herein have a coating which comprises a release agent, and some embodiments have a coating which comprises a release agent and has no adhesion promoter. In some embodiments the coating itself is a release agent for any additional materials applied to the fiber article. Examples of this type of coating which can also act as release agents are hydrocarbon and fluorocarbon silanes and are described in U.S. Pat. Nos. 6,733,824 and 6,767,579 and typical thicknesses for these coatings are between 2 nm to less than 10 microns.

Embodiments of the optical fiber disclosed herein having improved bend resistance can allow tight buffered cable and can even help to eliminate the need for loose-tube gel buffered cable, which is expensive to produce and costly to handle in the field. The improved bend resistance fiber should also allow lower cost cables by reducing the number or quantity of strength members in the cable design.

Optical fiber disclosed herein having improved bend resistance can be employed in Fiber-to-the-Premises (FTTP), in computer interconnects, in tight packaging in a switching box, and other areas that require bending, twisting, or wrapping of the fiber.

Additionally, embodiments of the optical fiber disclosed herein can be produced with faster draw speeds than conventional fibers and coatings by eliminating the equipment and space necessary to apply and cure a primary coating (in addition to a secondary coating). Furthermore, embodiments of the optical fiber disclosed herein may comprise lower cost coatings and/or reduced cure speed, e.g. by employing UV cured polymers, such as acrylates, silicones, and epoxies, or thermoplastic coatings, such as polyolefins or PVC, which help with achieving direct tight buffering of the fiber on the draw. Moreover, the embodiments of the optical fiber disclosed herein having a single coating can help reduce the volume and strength requirements of the cabling that encases fiber.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

What is claimed is:

1. An optical fiber for transmitting optical signals comprised of light, the optical fiber comprising:
  a core region disposed about a longitudinal centerline and having a refractive index profile with a first maximum relative refractive index Δ1;
  a cladding region surrounding the core region, wherein the cladding region comprises an inner annular portion surrounding and in contact with the core region, a ring portion surrounding and in contact with the inner annular portion, and an outer annular portion surrounding and in contact with the ring portion, the inner annular portion comprising a second maximum relative refractive index Δ2, the ring portion comprising a minimum refractive index $\Delta_{MIN}$, and the outer annular portion comprising a third maximum relative refractive index $\Delta 3$, wherein $\Delta 1 > \Delta 2 > \Delta_{MIN}$, and $A3 > \Delta MIN$, and $\Delta 1 > \Delta 3$, wherein the outer annular portion comprises an outermost glass periphery; and a coating surrounding and in direct contact with the outermost glass periphery of the cladding region, the coating having a Young's modulus of elasticity greater than 30 MPa;

wherein the optical fiber exhibits a microbend induced loss of less than 5 dB at a wavelength of 1550 nm as measured by a lateral load wire mesh test.

2. The optical fiber of claim 1 wherein the coating is comprised of a UV cured polymer.

3. The optical fiber of claim 2 wherein the polymer is selected from the group consisting of acrylates, silicones, and epoxies.

4. The optical fiber of claim 1 wherein the coating is comprised of a thermoplastic polymer.

5. The optical fiber of claim 4 wherein the thermoplastic polymer is selected from the group consisting of polyolefins and polyvinylchlorides.

6. The optical fiber of claim 1 wherein the optical fiber has a microbend induced loss of less than 5 dB at a wavelength of 1625 nm as measured by a lateral load wire mesh test.

7. The optical fiber of claim 1 wherein the optical fiber has a microbend induced loss of less than 5 dB for all wavelengths between 1250 and 1700 nm as measured by a lateral load wire mesh test.

8. The optical fiber of claim 1 wherein the optical fiber has a 10 mm diameter bend induced loss of less than 5 dB/turn for all wavelengths between 1250 and 1700 nm.

9. The optical fiber of claim 1 wherein the optical fiber has a 6.33 mm diameter bend induced loss of less than 5 dB/turn for all wavelengths between 1250 and 1700 nm.

10. The optical fiber of claim 1 wherein the ring portion is provided with holes.

11. The optical fiber of claim 10 wherein at least some of the holes are spatially non-periodically disposed in the ring portion.

12. The optical fiber of claim 10 wherein at least some of the holes are spatially periodically disposed in the ring portion.

13. The optical fiber of claim 1 wherein the ring portion is doped with an index-decreasing dopant.

14. The optical fiber of claim 1 wherein the inner annular portion is hole-free.

15. The optical fiber of claim 1 wherein the outer annular portion is hole-free.

16. The optical fiber of claim 1 wherein $\Delta 2$ is substantially equal to $\Delta 3$.

17. The optical fiber of claim 1 wherein the inner annular portion is hole-free, the ring portion comprises holes, and the outer annular portion is hole-free.

18. An optical fiber for transmitting optical signals comprised of light, the optical fiber comprising:

a core region disposed about a longitudinal centerline and having a refractive index profile with a first maximum relative refractive index $\Delta 1$;

a cladding region surrounding the core region, the cladding region comprising a hole-free inner annular portion surrounding and in contact with the core region, a hole-containing ring portion surrounding and in contact with the inner annular portion, and a hole-free outer annular portion surrounding and in contact with the ring portion, the inner annular portion comprising a second maximum relative refractive index $\Delta 2$, and the outer annular portion comprising a third maximum relative refractive index $\Delta 3$, wherein $\Delta 1 > \Delta 2$, and $\Delta 1 > \Delta 3$, and wherein the ring region provides internal reflection sufficient to guide the light along an axial length of the core region; and a coating surrounding and in direct contact with the outer annular portion of the cladding region, the coating having a Young's modulus of elasticity greater than 30 MPa;

wherein the optical fiber exhibits a microbend induced loss of less than 5 dB at a wavelength of 1550 nm as measured by a lateral load wire mesh test.

19. An optical fiber for transmitting optical signals comprised of light, the optical fiber comprising:

a core region disposed about a longitudinal centerline and having a refractive index profile with a first maximum relative refractive index $\Delta 1$;

a cladding region surrounding the core region, the cladding region comprising an outermost glass periphery and a hole-containing ring portion surrounding the core region; and a coating surrounding and in direct contact with the outermost glass periphery of the cladding region, the coating having a Young's modulus of elasticity greater than 30 MPa;

wherein the optical fiber exhibits a microbend induced loss of less than 5 dB at a wavelength of 1550 nm as measured by a lateral load wire mesh test.

20. The optical fiber of claim 19 wherein the cladding region further comprises a hole-free inner annular portion surrounding and in contact with the core region, and the ring portion surrounds and is in contact with the inner annular portion, the inner annular portion comprising a second maximum relative refractive index $\Delta 2$, wherein $\Delta 1 > \Delta 2$.

21. The optical fiber of claim 20 wherein the cladding region further comprises a hole-free outer annular portion surrounding and in contact with the ring portion, the outer annular portion comprising a third maximum relative refractive index $\Delta 3$, wherein $\Delta 1 > \Delta 2$ and $\Delta 1 > \Delta 3$.

22. The optical fiber of claim 20 wherein $\Delta 2$ is substantially equal to $\Delta 3$.

* * * * *